United States Patent
Chebiyyam et al.

(10) Patent No.: US 11,480,961 B1
(45) Date of Patent: Oct. 25, 2022

(54) IMMERSIVE SOUND FOR TELEOPERATORS

(71) Applicant: Zoox, Inc., Foster City, CA (US)

(72) Inventors: Venkata Subrahmanyam Chandra Sekhar Chebiyyam, San Francisco, CA (US); Nam Gook Cho, Cupertino, CA (US); Jonathan Tyler Dowdall, San Francisco, CA (US); Subasingha Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 445 days.

(21) Appl. No.: 16/691,424

(22) Filed: Nov. 21, 2019

(51) Int. Cl.
| | | |
|---|---|---|
| G05D 1/00 | (2006.01) |
| G10L 25/51 | (2013.01) |
| H04R 1/40 | (2006.01) |
| H04R 3/00 | (2006.01) |
| H04R 5/02 | (2006.01) |
| H04R 5/027 | (2006.01) |
| H04S 3/00 | (2006.01) |
| H04S 7/00 | (2006.01) |
| H04R 5/04 | (2006.01) |
| H04L 67/12 | (2022.01) |

(52) U.S. Cl.
CPC ............. *G05D 1/005* (2013.01); *G10L 25/51* (2013.01); *H04R 1/406* (2013.01); *H04R 3/005* (2013.01); *H04R 5/02* (2013.01); *H04R 5/027* (2013.01); *H04R 5/04* (2013.01); *H04S 3/008* (2013.01); *H04S 7/303* (2013.01); *H04L 67/12* (2013.01); *H04R 2499/13* (2013.01); *H04S 2400/01* (2013.01); *H04S 2400/15* (2013.01)

(58) Field of Classification Search
None
See application file for complete search history.

(56) References Cited

U.S. PATENT DOCUMENTS

| | | | |
|---|---|---|---|
| 9,507,346 B1 | 11/2016 | Levinson et al. | |
| 9,612,123 B1 | 4/2017 | Levinson et al. | |
| 9,956,910 B2* | 5/2018 | McNew | B60Q 9/008 |
| 10,353,390 B2 | 7/2019 | Linscott et al. | |
| 10,536,791 B2* | 1/2020 | Wacquant | H04R 3/005 |
| 10,798,509 B1* | 10/2020 | Lyren | G06F 3/013 |
| 2018/0053413 A1* | 2/2018 | Patil | G08G 1/0968 |
| 2019/0049242 A1 | 2/2019 | Adams et al. | |
| 2019/0049566 A1 | 2/2019 | Adams et al. | |
| 2021/0349459 A1* | 11/2021 | Huang | G06F 3/00 |
| 2021/0352429 A1* | 11/2021 | Lyren | H04S 7/303 |

* cited by examiner

*Primary Examiner* — Paul W Huber
(74) *Attorney, Agent, or Firm* — Lee & Hayes, P.C.

(57) ABSTRACT

Immersive experiences for users are described herein. In an example, audio data from a plurality of audio sensors associated with a vehicle can be received by an audio data processing system. The audio data processing system can combine individual captured audio channels (e.g., from the plurality of audio sensors) into two or more audio channels for output via two or more speakers proximate a user. A first audio channel of the two or more audio channels can be output via a first speaker and second audio channel of the two or more audio channels to be output via a second speaker, wherein output of the first audio channel and the second audio channel causes a resulting sound corresponding to at least a portion of a sound scene associated with the vehicle. In an example, a user computing device operable by the user can receive an input from the user.

20 Claims, 8 Drawing Sheets

IMMERSIVE SOUND FOR TELEOPERATORS

BACKGROUND

Teleoperation, which can be referred to as remote operation, often includes control of a device or machine remotely. A vehicle service platform, such as an autonomous vehicle service platform, can be configured to provide teleoperator services should a vehicle (e.g., an autonomous vehicle) request—or otherwise require—teleoperation. In such an example, a teleoperator can control a vehicle or provide other signals via remote operation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
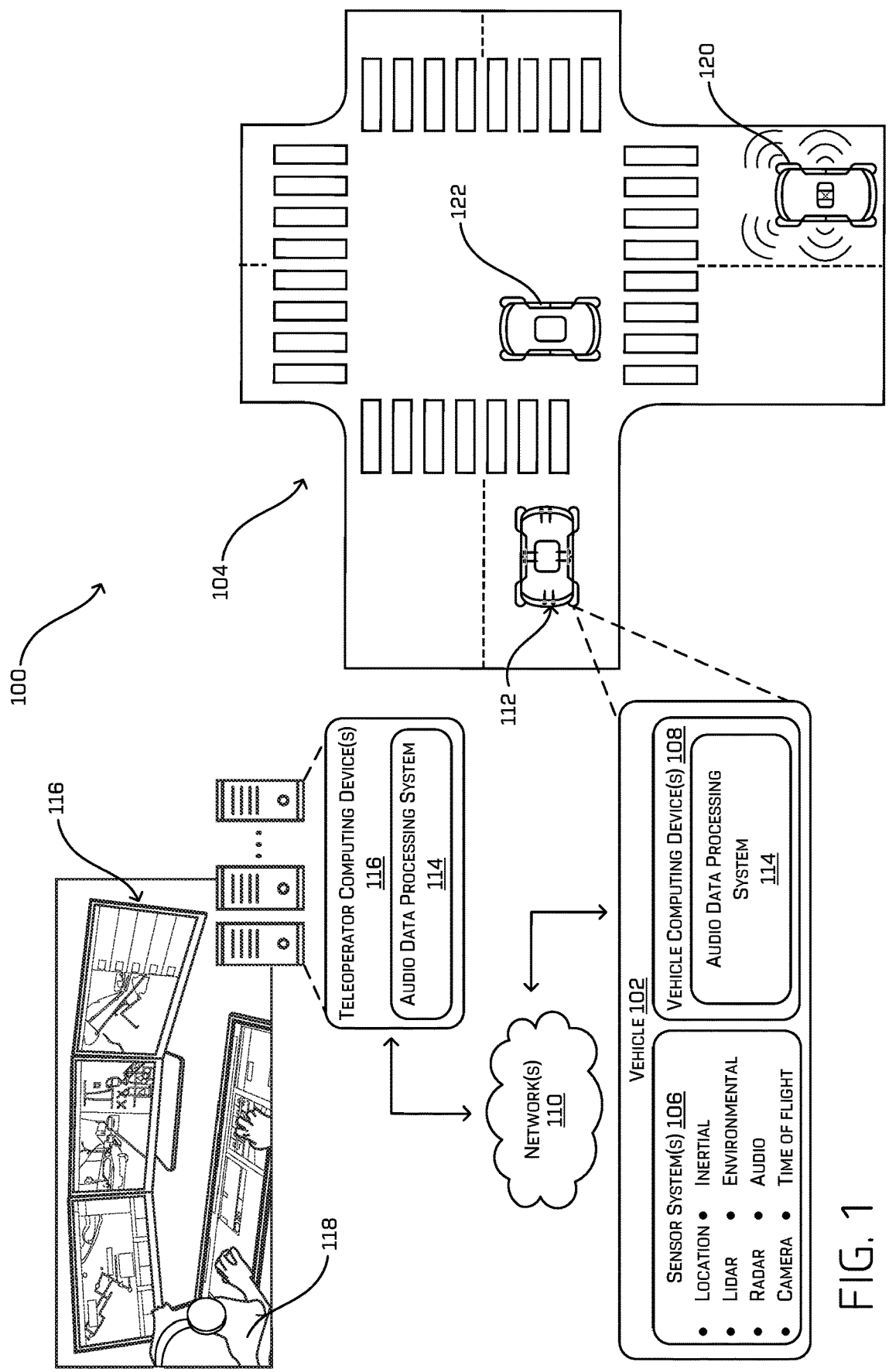
FIG. 1 illustrates an example environment for providing immersive sound for a teleoperator, as described herein.

Techniques described herein relate to providing immersive experiences for teleoperators. Teleoperators of a vehicle service platform can be human operators who are remotely located from a fleet of vehicles and capable of controlling or providing instructions to the fleet of vehicles from their remote location. In an example, teleoperators can better perform remote operations for the fleet of vehicles by hearing, in near real-time, sounds of the environments within which the fleet of vehicles are operating.

Each vehicle in the fleet of vehicles can be equipped with a plurality of audio sensors (e.g., microphones) that are associated with respective audio channels captured by the plurality of audio sensors. A remotely-located teleoperator can listen to each captured audio channel individually to understand events within an environment of the vehicle. However, the teleoperator may not be able to localize events and/or localize events accurately and/or quickly when listening to each captured audio channel individually. When individual captured audio channels of the plurality of captured audio channels are combined, or otherwise processed, prior to being output via speaker(s) proximate the teleoperator, such output can localize events so that the teleoperator can perceive events within the environment of the vehicle as if the teleoperator is in the same environment. Techniques described herein relate to processing audio data received from a plurality of audio sensors, each associated with a captured audio channel, such to generate a reduced number of audio channels that can be output via speaker(s) proximate teleoperator(s). As a result, such teleoperator(s) can localize events in environments of the fleet of vehicles and can determine when—and how—to provide remote control of individual vehicles of the fleet of vehicles while the vehicles are operating in the environments.

In an example, an audio data processing system described herein can receive audio data from a plurality of audio sensors associated with a vehicle. In at least one example, each audio sensor of the plurality of audio sensors is associated with a captured audio channel of a plurality of captured audio channels. In at least one example, the audio data processing system can combine, or otherwise process, the plurality of captured audio channels into a reduced number of audio channels for output via two or more speakers proximate a teleoperator. In some examples, a first audio channel of the reduced number of audio channels can be output via a first speaker of the two or more speakers and a second audio channel of the reduced number of audio channels can be output via a second speaker of the two or more speakers. As described herein, in some examples, such sound can be output with a visual output (e.g., output via a virtual reality display proximate the teleoperator) for a fully immersive experience (e.g., sound and visual).

In at least one example, a sound resulting from the output of the audio channels via two or more speakers can be associated with a spatialized, three-dimensional scene (e.g., binaural if output via a pair of speakers, such as headphones) such that the teleoperator is immersed with sound. The resulting sound can simulate the real-world environment within which the vehicle is positioned. That is, as a result of causing the first audio channel and the second audio channel (which have been generated from combining, mixing, or otherwise processing the plurality of captured audio channels) to be output via respective speakers, the resulting sound can be localized for the teleoperator, relative to the vehicle, such that the teleoperator can perceive sound in the environment of the vehicle from the perspective of the vehicle. As such, the teleoperator can perceive the sound scene of the environment of the vehicle as if they were located in the vehicle, even though the teleoperator is remotely located from the vehicle. As a result, the teleoperator can identify and/or determine information associated with events occurring in and/or around the vehicle (e.g., in real time or near-real time (subject to transmission delays and technical tolerances)), as if the teleoperator where present in the vehicle. In at least one example, the teleoperator can determine whether an event occurs, and information associated with the event (e.g., contextual information).

Techniques described herein are useful for enabling teleoperators the ability to more fully understand environments of vehicles that they control, at least in some scenarios, which enables such teleoperators to make more informed decisions for remotely controlling—or otherwise instructing—such vehicles. In some examples, sensor system(s) on a vehicle—such as light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., red, green blue (RGB), infrared (IR), intensity, depth, etc.), wheel encoders, environment sensors (e.g., temperature sensors, humidity sensors, light sensors, pressure sensors, etc.), Time of Flight (ToF) sensors, etc.—may be inoperable, occluded, or not yet in range of an event that necessitates control by or instructions from a teleoperator. However, if audio sensors (e.g., microphones) are operable, such audio sensors can generate and transmit audio data that can enable the teleoperator to detect an event even though other sensors on the vehicle are inoperable, occluded, or not yet in range of the event. That is, sound can often be detected by audio sensors before other sensor system(s) are able to detect events that can affect the vehicle, and by localizing sound for teleoperators, teleoperators can make informed decisions with respect to maneuvering the vehicle safely when confronted with such events. As such, techniques described herein enable increased safety mechanisms, for instance, in scenarios involving emergency vehicles, police and/or otherwise directed traffic, occlusions and the like. Therefore, techniques described herein offer improvements in existing technology for teleoperations, for example, in the case of autonomous vehicles.

Furthermore, techniques described herein relate to processing audio data such that a number of captured audio channels associated with the audio data is reduced for subsequent output (e.g., to speaker(s) associated with a teleoperator). In such examples, techniques described herein can offer redundancy in providing immersive sound experiences even if one or more of the audio sensors is inoperable. As such, techniques described herein relate to systems and methods of providing redundancy for teleoperators. Therefore, techniques described herein offer improvements in existing technology for teleoperations, for example, in the case of autonomous vehicles.

Techniques described herein can be implemented in a number of ways. Example implementations are provided below with reference to the following figures. Example implementations are discussed in the context of autonomous vehicles; however, the methods, apparatuses, and systems described herein can be applied to a variety of systems (e.g., a sensor system or a robotic platform), and are not limited to autonomous vehicles. Additionally, the techniques described herein can be used with real data (e.g., captured using sensor(s)), simulated data (e.g., generated by a simulator), or any combination of the two.

FIG. 1 illustrates an example environment 100 for providing immersive sound for a teleoperator, as described herein. As illustrated in FIG. 1, a vehicle 102 is driving in an environment 104. In at least one example, the vehicle 102 can be an autonomous vehicle. An autonomous vehicle can be configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since an autonomous vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 102 is an autonomous vehicle; however, the vehicle 102 could be any other type of vehicle.

In at least one example, the vehicle 102 is associated with one or more sensor systems 106 and one or more vehicle computing devices 108. In at least one example, the sensor system(s) 106 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 106 can include multiple instances of each of these or other types of sensors. For example, the lidar sensors can include individual lidar sensors located at the corners, front, back, sides, and/or top of the vehicle 102. In at least one example, the audio sensors can include individual audio sensors (e.g., microphones 112) that can be located at various positions on the corners, front, back, sides, and/or top of the exterior of the vehicle 102. Audio sensors can additionally be positioned at various locations about the interior of the vehicle 102. As another example, the camera sensors can include multiple cameras positioned at various locations about the exterior and/or interior of the vehicle 102. The sensor system(s) 106 can provide input to the vehicle computing device(s) 108. In some examples, the sensor system(s) 106 can preprocess at least some of the sensor data prior to sending the sensor data to the vehicle computing device(s) 108. In at least one example, the sensor system(s) 106 can send sensor data, via network(s) 110, to one or more remote computing device(s) at a particular frequency, after a lapse of a predetermined period of time, in near real-time, etc.

As described above, in at least one example, the sensor system(s) 106 can include audio sensors, which can include microphones 112. In at least one example, the microphones 112 can be positioned at various locations about the exterior and/or interior of the vehicle 102. In FIG. 1, there are eight microphones 112 illustrated (e.g., two on each side of the exterior of the vehicle 102), but the vehicle 102 can include any number of microphones 112. In at least one example, each microphone can convert sound into electrical energy, which can be referred to herein as a "captured audio channel." Thus, in the example illustrated in FIG. 1, the microphones 112 can output eight captured audio channels. The captured audio channel(s) can be referred to herein as "audio data."

In at least one example, an audio data processing system 114 can receive audio data and can process the audio data. In some examples, the audio data processing system 114 can be associated with the vehicle computing device(s) 108. In such examples, the microphones 112 can provide the audio data to the vehicle computing device(s) 108. In some examples, the microphones 112 can preprocess at least some of the audio data prior to sending the audio data to the vehicle computing device(s) 108. The vehicle computing device(s) 108 can receive the audio data via the audio data processing system 114.

In some examples, the audio data processing system 114 can be associated with one or more remotely located computing devices, such as teleoperator computing device(s) 116. In such examples, the microphones 112 can send audio data, via network(s) 110, to the teleoperator computing device(s) 116 at a particular frequency, after a lapse of a predetermined period of time, in near real-time, upon an occurrence/detection of an event, etc. In some examples, the microphones 112 can preprocess at least some of the audio data prior to sending the audio data to the teleoperator computing device(s) 116. In some examples, the microphones 112 can send the audio data to the vehicle computing device(s) 108 prior to sending the audio data to the teleoperator computing device(s) 116. The teleoperator computing device(s) 116 can receive the audio data via the audio data processing system 114.

While the audio data processing system 114 is illustrated in association with the vehicle computing device(s) 108 and/or the teleoperator computing device(s) 116, and described above as processing audio data on the vehicle computing device(s) 108 or the teleoperator computing device(s) 116, in some examples, the audio data processing system 114 on each of the computing device(s) can partially process audio data such that audio data processing is a distributed process.

In at least one example, a teleoperations system, which may include one or more teleoperators located at one or more teleoperations centers, can provide remote support for vehicles such as the vehicle 102. In some examples, the one or more teleoperators can be human. In some examples, one or more of the teleoperators may not be human, such as, for example, they may be computer systems leveraging artificial intelligence, machine learning, and/or other decision-making strategies. In some examples, teleoperator computing device(s) 116 and a teleoperator 118 can be part of the teleoperations system. The teleoperator computing device(s) 116 can be operable by the teleoperator 118. The teleoperator 118, which can be a user designated to control vehicles, such as the vehicle 102, can be remotely located from the vehicles and can control the vehicles by sending instruction(s) to the vehicles via the teleoperator computing device(s) 116. Additional details associated with teleoperations are provided below.

Figure 2:
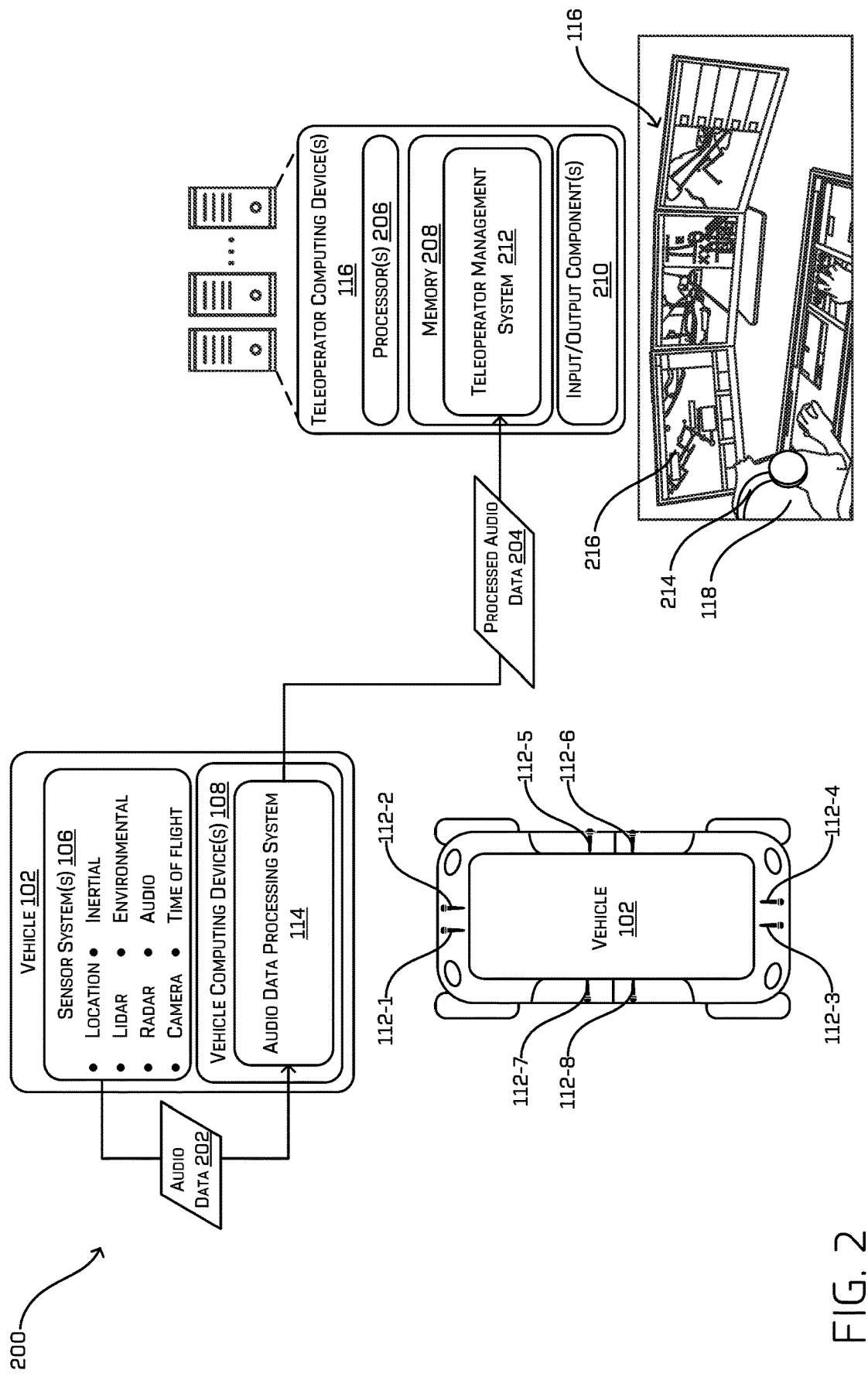
FIG. 2 illustrates an example environment that provides additional details associated with the example environment described above with reference to FIG. 1, wherein audio data is processed by the vehicle computing device(s), as described herein.
Figure 3:
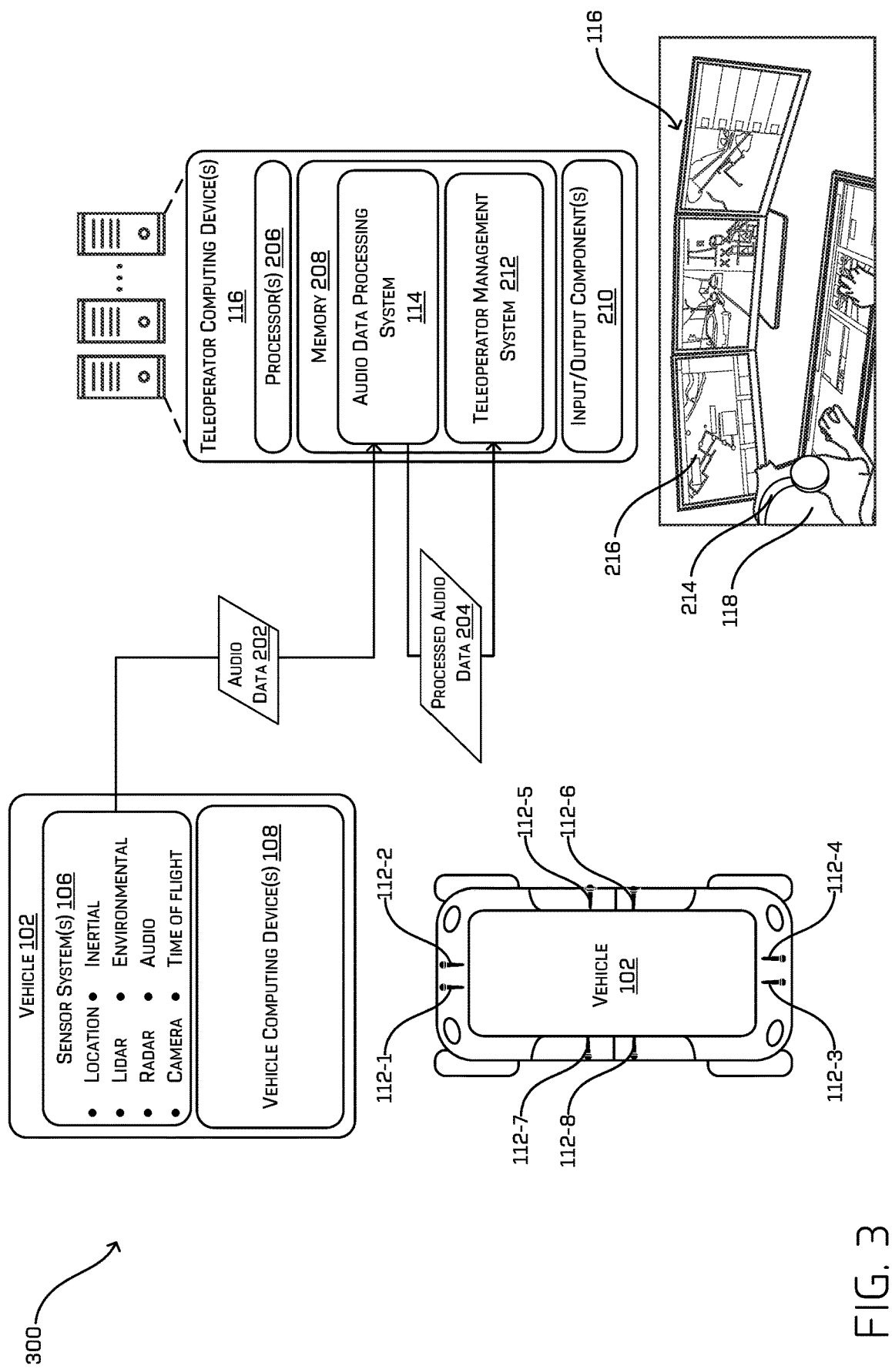
FIG. 3 illustrates an example environment as described in FIG. 1, which provides additional details associated with the example environment described above with reference to FIG. 1, wherein audio data is processed by remotely located teleoperator computing device(s), as described herein.
Figure 4:
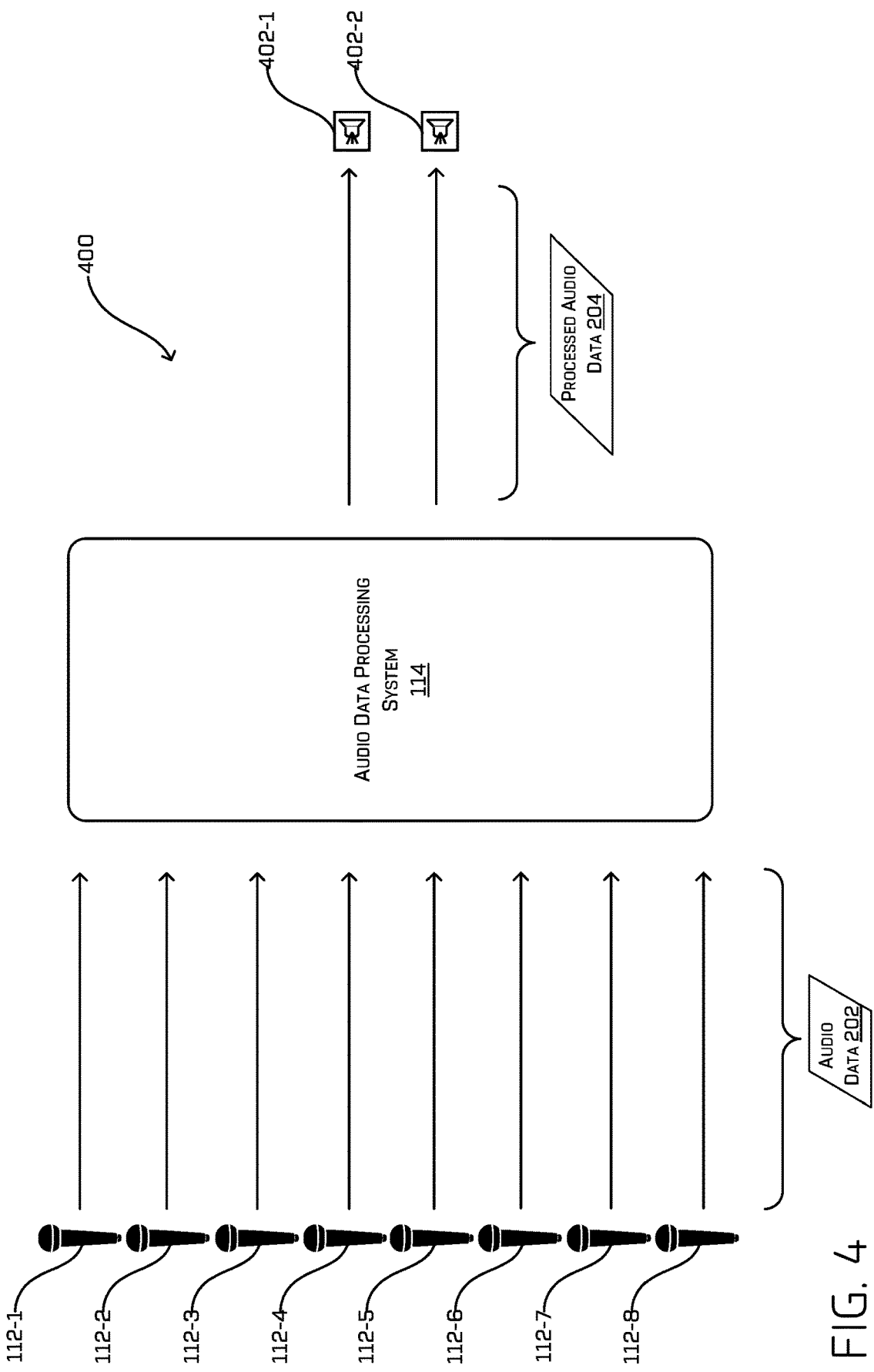
FIG. 4 illustrates an example environment for processing audio data, as described herein.

In at least one example, the audio data processing system 114 can process the audio data to generate processed audio data. In such an example, the audio data processing system 114 can combine, mix, or otherwise process the audio data received via the microphones 112 into fewer audio channels for output via one or more output components (e.g., speakers). FIGS. 2-4 provide additional details associated with such audio data processing.

FIG. 2 illustrates an example environment 200, which provides additional details associated with the example environment described above with reference to FIG. 1, wherein audio data is processed by the vehicle computing device(s) 108. As illustrated in FIG. 2, the microphones 112 (enumerated in FIG. 2 as microphones 112-1 through 112-8) can generate audio data 202. The configuration of the microphones 112 in FIG. 2 is merely an example configuration and, as described above, the vehicle 102 can be associated with any number of microphones 112, which can be arranged in any configuration internally and/or externally. In at least one example, each microphone can be associated with one or more audio sensors. The audio data 202 can be provided to the audio data processing system 114, which, in FIG. 2, is associated with the vehicle computing device(s) 108.

The audio data processing system 114 can process the audio data to generate processed audio data 204. That is, the audio data processing system 114 can combine, mix, or otherwise process the captured audio channels associated with the audio data 202 into a reduced number of audio channels (e.g., the processed audio data 204). In at least one example, such combining, mixing, or other processing can be based at least in part on the location of the microphones 112 on the vehicle 102 and a number of intended output components (e.g., speakers).

In some examples, the combining, mixing, or other processing can be based at least in part on the teleoperator 118. For instance, in at least one example, the audio data processing system 114 can determine a characteristic of the teleoperator 118 (e.g., position, orientation, which direction the teleoperator 118 is facing, etc.), relative to a pose of the vehicle 102 (e.g., position, orientation, etc.), and can combine, mix, or otherwise process the audio data 202 such that the resulting sound is localized for the teleoperator 118 relative to the vehicle 102. As a non-limiting example, if an emergency vehicle is approaching the vehicle from head-on, the sounds played for the teleoperator may be such that, when seated in a first position, the teleoperator perceives the emergency vehicle as being in front of her, whereas, as the teleoperator turns her head, the sounds may be generated to be perceived as if coming from varying angles such that the location of the sound relative to the teleoperator remains fixed. Furthermore, in some examples, additional or alternative characteristics of the teleoperator 118 can be used in determining how to combine, mix, or otherwise process the audio data 202. For example, in at least one example, a head shape or ear shape of the teleoperator 118, if known, can be used in determining how to combine, mix, or otherwise process the audio data 202. That is, in at least one example, the audio data processing system 114 can determine an identity of the teleoperator 118, access data associated with the identified teleoperator 118, and combine, mix, or otherwise process the audio data 202 based at least in part on characteristics associated with the identified teleoperator 118.

Furthermore, in some examples, additional or other factors can affect processing by the audio data processing system 114. For example, the audio data processing system 114 can determine characteristics of the audio sensor(s) 112 (e.g., frequency responses of individual sensor(s) 112) and can process the audio data 202 based at least in part on such characteristics. Moreover, the audio data processing system 114 can determine characteristics of output devices (e.g., speakers), which can include, but are not limited to, frequency of responses of individual speakers, spatial positioning, etc., and can process the audio data 202 based at least in part on such characteristics.

In at least one example, the audio data processing system 114 can utilize binaural rendering techniques to process the audio data 202. In such an example, the resulting processed audio data 204 can comprise a two-channel audio that can be output as a binaural scene. In examples where more than two output components are to be used, the processed audio data 204 can comprise a number of channels that corresponds to the total number of output components. In some examples, the audio data processing system 114 can perform sound separation techniques to extract certain sounds from the resulting sound. For example, in some examples, the audio data processing system 114 can perform one or more beamforming techniques such to cause the resulting sound to be output from a particular source and in a particular direction.

In some examples, the audio data processing system 114 can artificially alter the processing such to not maintain the fidelity of perception of the audio scene but to alter perception of audio scene by the teleoperator 118 to enhance certain events or modify certain properties to aid perception. For example, the audio data processing system 114 can separate sources, and instead of rendering them binaurally exactly where they are located, the audio data processing system 114 can render individual sources at positions in a 360-degree plane so that the spatial separation between the events heard by the teleoperator 118 is maximized to enable individual sources to be heard more clearly.

In at least one example, the audio data processing system 114 can send the processed audio data 204 to the teleoperator computing device(s) 116 (e.g., via the network(s) 110, which are not pictured in FIG. 2).

The teleoperator computing device(s) 116 can comprise processor(s) 206, memory 208, and one or more input/output components 210. Additional details associated with the processor(s) 206 and memory 208 are described below with reference to FIG. 5. In at least one example, the memory 208 can store a teleoperator management system 212.

The teleoperator management system 212, which can include a teleoperator application, can enable the teleoperator 118 to interact with the teleoperator computing device(s) 116 for providing teleoperator services to assist vehicles, such as the vehicle 102, in navigating within an environment. In at least one example, the teleoperator management system 212 can implement one or more user interfaces to facilitate such interaction. The one or more interfaces which can be configured to provide the teleoperator 118 with data related to operations of one or more vehicles. For example, the one or more interfaces can be configured to show content related to sensor data received from the vehicle(s), content related to the road network, and/or additional content or information to facilitate providing assistance to the vehicle(s). Furthermore, in some examples, the one or more interfaces can be configured to enable the teleoperator 118 to provide information to the vehicle(s), for example, in the form of teleoperation instructions providing guidance to the vehicle(s) or, in some examples, controlling the vehicle(s). In some examples, the teleoperator management system 212 can exchange message data with the vehicle computing device(s) 108 and/or otherwise interface with the vehicle computing device(s) 108 for facilitating teleoperations as described herein. For example, a teleoperator 118 can receive sensor data captured by the vehicle 102 or data determined by the vehicle 102 (e.g., identification of objects, classification information, segmentation information, route information, drivable area boundaries, etc.). In some examples, the teleoperator can request information or receive information as provided by the vehicle 102. In some examples, the teleoperator can review data and transmit instructions to directly or indirectly control the vehicle 102. For example, a teleoperator can transmit express steering and/or acceleration instructions, and/or the teleoperator can transmit an indication of a drivable area (e.g., around an obstacle in an environment) such that the vehicle 102 can determine actions within the area defined by the teleoperator.

Additional details associated with the teleoperator services and/or systems associated therewith are described with reference to U.S. Pat. No. 9,507,346, issued on Nov. 29, 2016, the entire contents of which are incorporated by reference herein. Furthermore, additional details associated with the teleoperator services and/or systems associated therewith are described with reference to U.S. patent application Ser. No. 16/457,289, filed on Jun. 28, 2019, and U.S. patent application Ser. No. 16/457,341, filed on Jun. 28, 2019, the entire contents of both of which are incorporated by reference herein.

In some examples, the audio data 202 can be processed by the audio data processing system 114 and provided to the teleoperator computing device(s) 116 in near real-time. In such examples, the teleoperator 118 can monitor events within the environment 104 of the vehicle 102 in near real-time and can perform teleoperator services on an as-needed basis (e.g., when the teleoperator 118 observes or otherwise detects the need to remotely control the vehicle 102, for example to resolve an event or issue that may otherwise affect the safety of occupants in the vehicle 102 or objects proximate the vehicle 102). In other examples, the audio data 202 can be processed by the audio data processing system 114 and can be sent to the teleoperator computing device(s) 116 upon detection of an event that invokes teleoperator services. For example, based at least in part on detecting, via analysis of the audio data 202, the presence of an emergency vehicle (e.g., emergency vehicle 120 in FIG. 1) in the environment 104 of the vehicle 102, the audio data processing system 114 can process the audio data 202 and can send the processed audio data 204 to the teleoperator computing device(s) 116. In at least one example, an event can be detected in the audio data 202 based at least in part on analyzing the audio data 202 using one or more machine learned models that are trained to detect particular events. Additional details associated with detecting an event, such as the presence of an emergency vehicle, in audio data are described in U.S. patent application Ser. No. 16/661,898, filed on Oct. 23, 2019, the entire contents of which are incorporated by reference herein.

The input/output component(s) 210 can include input components (e.g., keyboards, joysticks, mice, touch screens, styluses, dials, keypads, microphones, gesture-input systems, etc.) and/or output components (e.g., speaker(s), display(s), etc.) and the like.

The input components can enable the teleoperator 118 to provide information to vehicle(s), for example, in the form of teleoperation instructions providing guidance to the vehicle(s). The input components can be configured to translate gestures performed by the teleoperator 118 into input commands for the one or more interfaces associated with the teleoperator management system 212.

The output components can provide information to the teleoperator 118. In at least one example, a speaker can receive audio data 202 and/or processed audio data 204 (e.g., an audio channel) and can transform such data into sound waves, that when connected to an amplifier, outputs a sound. In FIG. 2, two speakers are depicted in association with a headset 214 or pair of earphones worn by the teleoperator 118. However, the speaker(s) can be associated with other output device(s) that can be proximate to the teleoperator 118.

A display can comprise an output surface and/or projecting mechanism that presents text, graphics, and/or other content. Display(s) can include cathode ray tube (CRT) display(s), liquid crystal display (LCD) display(s), light-emitting diode display(s), gas plasma display(s), etc. In some examples, a display can be an augmented reality (AR) display or a virtual reality (VR) display. Display(s) can be configured to provide the teleoperator 118 with data related to operations of one or more vehicles. For example, display(s) can present content related to sensor data received from the vehicle(s), content related to the road network, and/or additional content or information to facilitate providing assistance to the vehicle(s). FIG. 2 illustrates three displays 216, but the teleoperator computing device(s) 116 can operate any number of displays.

In at least one example, the teleoperator management system 212 can receive the processed audio data 204 and can cause the processed audio data 204 to be output via the input/output component(s) 210 (e.g., speaker(s)). As described above, when the processed audio data 204 is output via two or more speakers, the resulting sound can be localized for the teleoperator 118, relative to the vehicle 102. That is, the resulting sound can be output as a spatialized, three-dimensional scene such that the teleoperator 118 is immersed with sound. The resulting sound can simulate the real-world environment 104 within which the vehicle 102 is positioned. That is, as a result of causing the processed audio data 204 to be output via two or more speakers, the resulting sound can be localized for the teleoperator 118, relative to the vehicle 102, such that the teleoperator 118 can perceive sound in the environment 104 of the vehicle 102 from the perspective of the vehicle 102. As such, the teleoperator 118 can perceive sound as if they were located in the vehicle 102, even though the teleoperator 118 is remotely located from the vehicle 102. As a result, the teleoperator 118 can identify and/or determine information associated with events occurring in and/or around the vehicle 102, as if the teleoperator 118 where present in the vehicle 102. In at least one example, the teleoperator 118 can determine whether an event occurs, and information associated with the event (e.g., contextual information). As such, the teleoperator 118 can use the resulting output to detect events in the environment 104 of the vehicle 102 and/or to determine whether and/or how to control the vehicle 102 responsive to the detection of events.

FIG. 3 illustrates an example environment 300 as described in FIG. 1, wherein audio data is processed by remotely located teleoperator computing device(s) 116. FIG. 3 is substantially similar to FIG. 2; however, the audio data processing system 114 is associated with the teleoperator computing device(s) 116 instead of the vehicle computing device(s) 108. As such, in FIG. 3, the microphones 112 can send the audio data 202 to the teleoperator computing device(s) 116 and the teleoperator computing device(s) 116 can process the audio data 202 via the audio data processing system 114. In some examples, the audio data 202 can be provided to the teleoperator computing device(s) 116 in near real-time. In other examples, the audio data 202 can be sent to the teleoperator computing device(s) 116 upon detection of an event that invokes teleoperator services. For example, based at least in part on detecting, via analysis of the audio data 202, the presence of an emergency vehicle (e.g., emergency vehicle 120 in FIG. 1) in the environment 104 of the vehicle 102, the audio data processing system 114 can send the audio data 202 to the teleoperator computing device(s) 116. In at least one example, an event can be detected in the audio data 202 based at least in part on analyzing the audio data 202 using one or more machine learned models that are trained to detect particular events, as described above.

The audio data processing system 114 can process the audio data 202 and transmit the processed audio data 204 to the teleoperator management system 212. The teleoperator management system 212 can cause the processed audio data 204 to be output via the input/output component(s) 210 (e.g., speakers), as described above with reference to FIG. 2.

In some examples, the audio data 202 can be processed by the audio data processing system 114 in near real-time (e.g., as the audio data 202 is received from the microphones 112). In such examples, the teleoperator 118 can monitor events within the environment 104 of the vehicle 102 in near real-time, for instance via the teleoperator management system 212, and can perform teleoperator services on an as-needed basis (e.g., when the teleoperator 118 observes or otherwise detects the need to remotely control the vehicle 102, for example to resolve an event or issue that may otherwise affect the safety of occupants in the vehicle 102 or objects proximate the vehicle 102). In other examples, the audio data 202 can be processed by the audio data processing system 114 upon detection of an event that invokes teleoperator services. For example, based at least in part on detecting, via analysis of the audio data 202, the presence of an emergency vehicle (e.g., emergency vehicle 120 in FIG. 1) in the environment 104 of the vehicle 102, the audio data processing system 114 can process the audio data 202 and can send the processed audio data 204 to the teleoperator management system 212. In at least one example, an event can be detected in the audio data 202 based at least in part on analyzing the audio data 202 using one or more machine learned models that are trained to detect particular events.

FIG. 4 illustrates an example environment 400 for processing audio data, as described herein. As illustrated in FIG. 4, and described above with reference to FIGS. 1-3, the vehicle 102 can be associated with a plurality of microphones 112, which are illustrated in FIG. 4 as microphones 112-1 through 112-8. Each microphone 112-1-112-8 can be associated with at least one captured audio channel (e.g., an audio captured by the respective microphone), the combined output of which (e.g., eight captured audio channels) can be associated with the audio data 202. In at least one example, any of the microphones 112 can include one or more audio sensors, in which case, each audio sensor can output a captured audio channel.

The audio data processing system 114 can be associated with the vehicle computing device(s) 108 and/or the teleoperator computing device(s) 116, as described above. The audio data processing system 114 can combine, mix, or otherwise process the audio data 202 to generate processed audio data 204. In at least one example, such combining, mixing, or other processing can be based at least in part on the location of the microphones 112 on the vehicle 102 and a number of intended output components (e.g., speakers). Furthermore, in at least one example, such combining, mixing, or other processing can be based at least in part on the teleoperator 118 (e.g., characteristic(s) associated therewith), microphones 112, speakers 402, etc. As described above, in at least one example, the audio data processing system 114 can utilize binaural rendering techniques to process the audio data 202. The resulting processed audio data 204 can comprise two-channel audio that can be output as a binaural scene. For instance, as illustrated in FIG. 4, the audio data processing system 114 can combine the eight captured audio channels into two audio channels for output via two speakers 402 (individually 402-1 and 402-2) proximate the teleoperator 118. In at least one example, the two speakers 402 can be positioned on different sides (e.g., left and right) of the teleoperator 118 so that the sound output via the speakers 402 is localized for the teleoperator 118 and, as described above, relative to the vehicle 102. That is, the teleoperator 118 can perceive sound in the environment 104 of the vehicle 102 from the perspective of the vehicle 102 as if they were located in the vehicle 102, even though the teleoperator 118 is remotely located from the vehicle 102. Additional details are described above.

While FIG. 4 illustrates combining eight captured audio channels into two audio channels, the audio data processing system 114 can combine, mix, or otherwise process any number of captured audio channels associated with the microphones 112 (e.g., which can correspond to the number of microphones 112, for example) to reduce the number of audio channels. In some examples, the number of audio channels associated with the processed audio data 204 can be determined based at least in part on the number of output components via which the processed audio data 204 is to be output. For example, in FIG. 4, there are two speakers 402 associated with a headset 214 or pair of earphones, but in other examples, and output component can be associated with more than two speakers. In such an example, the processed audio data 204 can comprise a number of audio channels that correspond to the number of speakers associated with the output components (e.g., speakers).

Returning to FIG. 1, with localized sound, the teleoperator 118 can determine whether an event occurs in the environment 104 of the vehicle 102, and information associated with the event (e.g., contextual information). As illustrated in FIG. 1, an emergency vehicle 120 is approaching the intersection where the vehicle 102 is also located. However, there is another vehicle 122 in the intersection such that at least some of the sensor system(s) 106 associated with the vehicle 102 may not be able to access sensor data for the vehicle computing device(s) 108 to detect the emergency vehicle 120. That is, some of the sensor system(s) 106 may be occluded. As such, the vehicle 102 may not know that the emergency vehicle 120 is approaching the intersection. However, the emergency vehicle 120 can output sound such that it can be heard clearly, even if it cannot yet be seen.

Techniques described herein, enable the microphones 112 to receive and transmit audio data 202 to the audio data processing system 114. The audio data processing system 114 can process the audio data 202 such that the processed audio data 204 can be output via input/output component(s) 210 (e.g., the speaker(s) 402) of the teleoperator computing device(s) 116 and the teleoperator 118 can detect the presence of the emergency vehicle 120, even though the other sensor system(s) 106 have not yet detected the emergency vehicle 120. That is, techniques described herein enable the teleoperator 118 to detect the presence of the emergency vehicle 120 prior to other sensor system(s) 106 detecting the emergency vehicle 120. In at least one example, the localized sound output by the input/output component(s) 210 (e.g., the speaker(s) 402) can enable the teleoperator 118 to detect an event, such as the presence of the emergency vehicle 120.

In at least one example, sound resulting from output of the processed audio data 204 can be associated with information associated with an event (e.g., contextual information). For instance, if the event is associated with the presence of the emergency vehicle 120, the teleoperator 118 can determine whether an emergency vehicle is present in the environment 104, how many emergency vehicles are present in the environment 104, a type of each emergency vehicle present in the environment 104, where each emergency vehicle is relative to the vehicle 102 in the environment 104 (e.g., a direction of arrival associated with the event), a direction of travel of each emergency vehicle relative to the vehicle 102, a velocity at which each emergency vehicle is moving relative to the vehicle 102, etc.

In at least one example, responsive to detecting the presence of the emergency vehicle 120, the teleoperator 118 can determine that teleoperator services to remotely control the vehicle 102 are warranted. As such, the teleoperator 118 can interact with the teleoperator computing device(s) 116 to cause the vehicle 102 to perform a maneuver (e.g., via remote operation). For instance, the teleoperator 118 can send instruction(s) to the vehicle 102 via the teleoperator computing device(s) 116 that cause the vehicle 102 to slow down, drive to the side of the road, and/or stop (e.g., to allow the emergency vehicle 120 to pass). In some examples, instruction(s) sent from the teleoperator computing device(s) 116 can override any decisions made locally by the vehicle 102 (e.g., if the vehicle 102 is operating autonomously). That is, in some examples, the instruction(s) may instruct the vehicle computing device(s) 108 to disregard and/or alter a policy or decision made by the vehicle computing device(s) 108.

While FIGS. 1-4 are directed to an example implementation where techniques described herein are used for detecting the presence of the emergency vehicle 120 and maneuvering the vehicle 102 via teleoperator services, techniques described herein can additionally be applicable to other events. For instance, another vehicle in an environment of the vehicle 102 can be honking at the vehicle 102. Techniques described herein can be used for determining which vehicle is honking. Furthermore, in another example, techniques described herein can be useful in scenarios where a pedestrian, or other object in the environment 104 of the vehicle 102, yells at (or otherwise interacts with) the vehicle 102. In such an example, the teleoperator 118 can determine what it is the pedestrian is yelling, the direction from which the pedestrian is yelling, and/or other contextual information so that the teleoperator 118 can determine whether teleoperator services are warranted and/or cause the vehicle 102 to perform a maneuver responsive to detecting the pedestrian yelling at the vehicle 102. In another example, techniques described herein can be useful in scenarios where the vehicle 102 is driving in a construction zone or other area where a construction worker, police officer, or other individual is directing traffic. Techniques described herein can be useful in scenarios where another vehicle in the environment 104 is honking at the vehicle 102 and/or in scenarios where passengers are entering or exiting the vehicle 102. Each of the scenarios described above can be referred to as "events" and additional or alternative events are within the scope of this disclosure.

Figure 5:
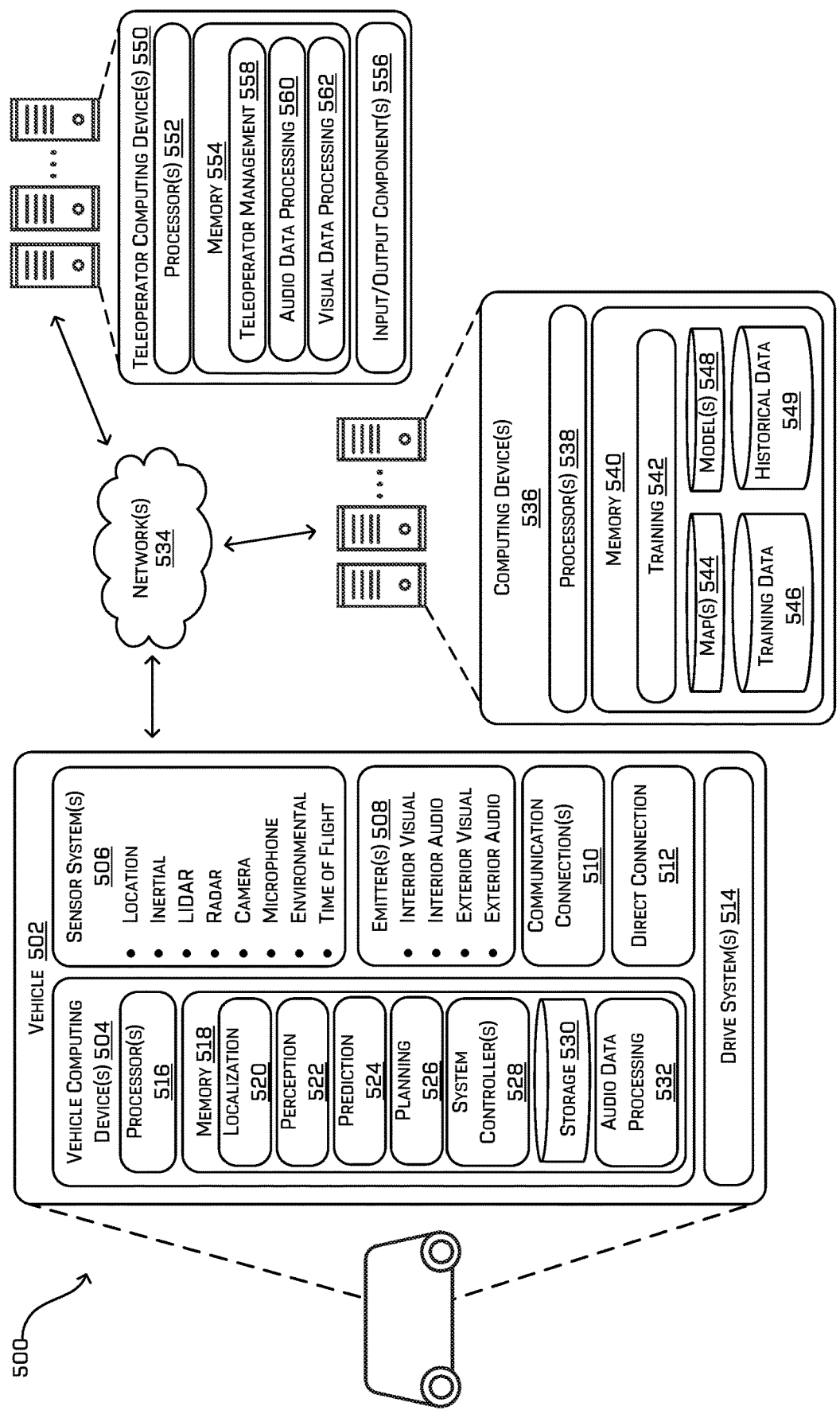
FIG. 5 is a block diagram illustrating an example system for performing techniques, as described herein.

FIG. 5 is a block diagram illustrating an example system 500 for performing techniques, as described herein. In at least one example, a vehicle 502, which can correspond to the vehicle 102 described above with reference to FIG. 1, can include one or more vehicle computing devices 504, one or more sensor systems 506, one or more emitters 508, one or more communication connections 510, at least one direct connection 512, and one or more drive systems 514. As described above, the vehicle 502 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 502 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 502 is an autonomous vehicle; however, the vehicle 502 could be any other type of vehicle. While only a single vehicle 502 is illustrated in FIG. 5, in a practical application, the example system 500 can include a plurality of vehicles, which, in some examples, can comprise a fleet of vehicles.

The vehicle computing device(s) 504, which can correspond to the vehicle computing device(s) 108 described above with reference to FIG. 1, can include processor(s) 516 and memory 518 communicatively coupled with the processor(s) 516. In the illustrated example, the memory 518 of the vehicle computing device(s) 504 stores a localization system 520, a perception system 522, a prediction system 524, a planning system 526, and one or more system controllers 528. Additionally, the memory 518 can include a storage 530, which can store map(s), model(s), etc. As described above, a map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. Model(s) can include machine learned models, as described below. Furthermore, as described above, the memory 518 can additionally include an audio data processing system 532, which can perform operations as described above with respect to the audio data processing system 114 of FIGS. 1-4.

In at least one example, the localization system 520 can determine a pose (position and orientation) of the vehicle 502 in relation to a local and/or global map based at least in part on sensor data received from the sensor system(s) 506 and/or map data associated with a map (e.g., of the map(s)). In at least one example, the localization system 520 can include, or be associated with a calibration system that is capable of performing operations for calibrating (determining various intrinsic and extrinsic parameters associated with any one or more of the sensor system(s) 506), localizing, and mapping substantially simultaneously. Additional details associated with such a system are described in U.S. patent application Ser. No. 15/675,487, filed on Aug. 11, 2017, now known as U.S. Patent Application Publication No. 2019/0049242, which is related to U.S. patent application Ser. No. 15/674,853, filed on Aug. 11, 2017, now known as U.S. Patent Application Publication No. 2019/0049566, the entire contents of both of which are incorporated by reference herein.

In at least one example, the perception system 522 can perform object detection, segmentation, and/or classification based at least in part on sensor data received from the sensor system(s) 506. In at least one example, the perception system 522 can receive raw sensor data (e.g., from the sensor system(s) 506). In at least one example, the perception system 522 can receive image data and can utilize one or more image processing algorithms to perform object detection, segmentation, and/or classification with respect to object(s) identified in the image data. In some examples, the perception system 522 can associate a bounding box (or otherwise an instance segmentation) with an identified object and can associate a confidence score associated with a classification of the identified object with the identified object. In some examples, objects, when rendered via a display, can be colored based on their perceived class. The perception system 522 can perform similar processes for one or more other modalities.

The prediction system 524 can receive sensor data from the sensor system(s) 506, map data associated with a map (e.g., of the map(s) which can be in storage 530), and/or perception data output from the perception system 522 (e.g., processed sensor data), and can output predictions associated with one or more objects within the environment of the vehicle 502. In at least one example, the planning system 526 can determine routes and/or trajectories to use to control the vehicle 502 based at least in part on sensor data received from the sensor system(s) 506 and/or any determinations made by the perception system 522 and/or prediction system 524.

Additional details of localization systems, perception systems, prediction systems, and/or planning systems that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 502 is not an autonomous vehicle), one or more of the aforementioned systems can be omitted from the vehicle 502. While the systems described above are illustrated as "onboard" the vehicle 502, in other implementations, the systems can be remotely located and/or accessible to the vehicle 502. Furthermore, while the systems are described above as "systems," such systems can comprise one or more components for performing operations attributed to each of the systems.

In at least one example, the localization system 520, the perception system 522, the prediction system 524, and/or the planning system 526 can process sensor data, as described above, and can send their respective outputs over network(s) 534, to computing device(s) 536. In at least one example, the localization system 520, the perception system 522, the prediction system 524, and/or the planning system 526 can send their respective outputs to the computing device(s) 536 at a particular frequency, after a lapse of a predetermined period of time, in near real-time, etc.

In at least one example, the vehicle computing device(s) 504 can include one or more system controllers 528, which can be configured to control steering, propulsion, braking, safety, emitters, communication, and other systems of the vehicle 502. These system controller(s) 528 can communicate with and/or control corresponding systems of the drive system(s) 514 and/or other systems of the vehicle 502.

In at least one example, the sensor system(s) 506, which can correspond to the sensor system(s) 106 described above with reference to FIG. 1, can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor system(s) 506 can include multiple instances of each of these or other types of sensors, as described above with reference to FIG. 1. The sensor system(s) 506 can provide input to the vehicle computing device(s) 504. In some examples, the sensor system(s) 506 can preprocess at least some of the sensor data prior to sending the sensor data to the vehicle computing device(s) 504. In at least one example, the sensor system(s) 506 can send sensor data, via the network(s) 534, to the computing device(s) 536 at a particular frequency, after a lapse of a predetermined period of time, in near real-time, etc.

The vehicle 502 can also include one or more emitters 508 for emitting light and/or sound, as described above. The emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 508 can be positioned at various locations about the exterior and/or interior of the vehicle 502.

The vehicle 502 can also include communication connection(s) 510 that enable communication between the vehicle 502 and other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device(s) 504 to another computing device or a network, such as network(s) 534. For example, the communications connection(s) 510 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 512 can directly connect the drive system(s) 514 and other systems of the vehicle 502.

In at least one example, the vehicle 502 can include drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include sensor system(s) to detect conditions of the drive system(s) 514 and/or the surroundings of the vehicle 502. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle 502, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 514. Furthermore, the drive system(s) 514 also include communication connection(s) that enable communication by the respective drive module with other local or remote computing device(s).

In FIG. 5, the vehicle computing device(s) 504, sensor system(s) 506, emitter(s) 508, and the communication connection(s) 510 are shown onboard the vehicle 502. However, in some examples, the vehicle computing device(s) 504, sensor system(s) 506, emitter(s) 508, and the communication connection(s) 510 can be implemented outside of an actual vehicle (i.e., not onboard the vehicle 502).

As described above, the vehicle 502 can send sensor data to the computing device(s) 536, via the network(s) 534. In some examples, the vehicle 502 can send raw sensor data to the computing device(s) 536. In other examples, the vehicle 502 can send processed sensor data and/or representations of sensor data to the computing device(s) 536 (e.g., data output from the localization system 520, the perception system 522, the prediction system 524, and/or the planning system 526). In some examples, the vehicle 502 can send sensor data to the computing device(s) 536 at a particular frequency, after a lapse of a predetermined period of time, in near real-time, etc.

The computing device(s) 536 can receive the sensor data (raw or processed) from the vehicle 502 and/or other data collection devices (which can include other vehicles like 505), as well as data from one or more third party sources and/or systems. In at least one example, the computing device(s) 536 can include processor(s) 538 and memory 540 communicatively coupled with the processor(s) 538. In the illustrated example, the memory 540 of the computing device(s) 536 stores a training system 542, a map(s) storage 544 (e.g., storing one or more maps), a training data storage 546 (e.g., storing training data accessible to the training system 542), a model(s) storage 548 (e.g., models output by the training system 542), and a historical data storage 549 (e.g., data associated with previous operations of a fleet of vehicles). In some examples, one or more of the systems and/or storage repositories can be associated with the vehicle 502 or other computing device(s) associated with the system 500 instead of, or in addition to, being associated with the memory 540 of the computing device(s) 536.

In at least one example, the training system 542 can train data model(s), which can be used for various operations as described herein. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc. The resulting data model(s) can be stored in the model(s) storage 548 and/or the storage 530 on the vehicle 502 and can be accessed by the perception system 522 for detecting and/or classifying objects.

The example system 500 can additionally include teleoperator computing device(s) 550, which can correspond to the teleoperator computing device(s) 116 described above with reference to FIGS. 1-5. The teleoperator computing device(s) 550 can include processor(s) 552, memory 554, and input/output component(s) 556, which can correspond to the processor(s) 206, memory 208, and input/output component(s) 210 described above with reference to FIGS. 2-4. The memory 554 can include a teleoperator management system 558 and, in some examples, an audio data processing system 560, and a visual data processing system 562. The teleoperator management system 558 can correspond to the teleoperator management system 212 described above with reference to FIGS. 2 and 3. The audio data processing system 560 can correspond to the audio data processing system 114 described above with reference to FIGS. 1-4. The visual data processing system 562 can perform image processing on visual data received by the teleoperator computing device(s) 550. Like the audio data processing system 560, the visual data processing system 562 can be additionally or alternatively associated with the memory 518 of the vehicle computing device(s) 504.

The processor(s) 516 of the vehicle 502, the processor(s) 538 of the computing device(s) 536, and the processor(s) 552 of the teleoperator computing device(s) 550 can be any suitable processor capable of executing instructions to process data and perform operations as described herein. By way of example and not limitation, the processor(s) 516, 538, and 552 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518, 540, and 554 are examples of non-transitory computer-readable media. Memory 518, 540, and 554 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in some examples, systems of the vehicle 502 can be associated with the computing device(s) 536 and/or the teleoperator computing device(s) 550, the systems of the computing device(s) 536 can be associated with the vehicle 502 and/or the teleoperator computing device(s) 550, and/or the systems of the teleoperator computing device(s) 550 can be associated with the vehicle 502 and/or the computing device(s) 536. That is, the vehicle 502 can perform one or more of the functions associated with the computing device(s) 536 and/or the teleoperator computing device(s) 550, and vice versa.

Figure 6:
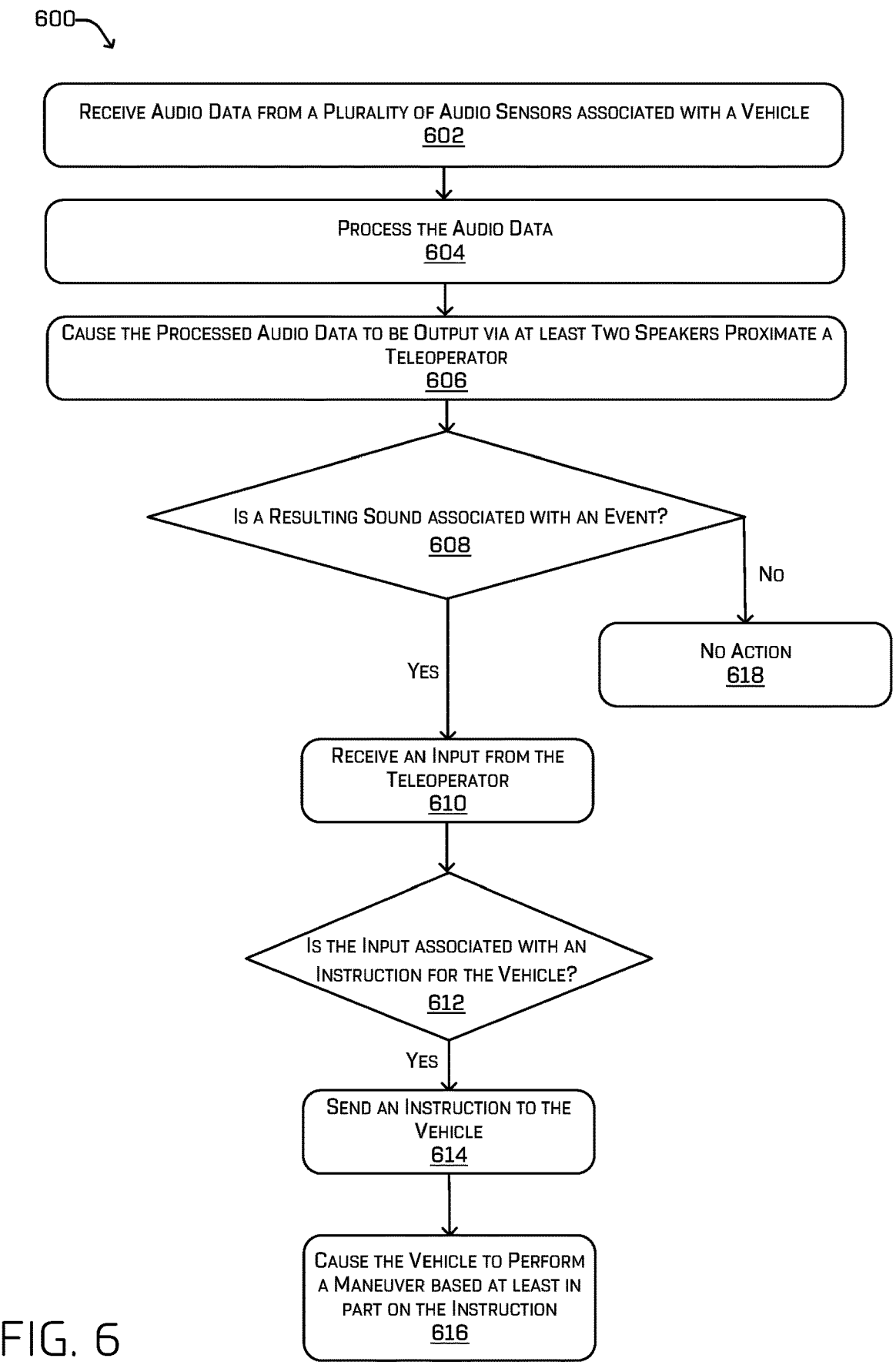
FIG. 6 illustrates an example process for providing immersive sound for a teleoperator, as described herein.
Figure 7:
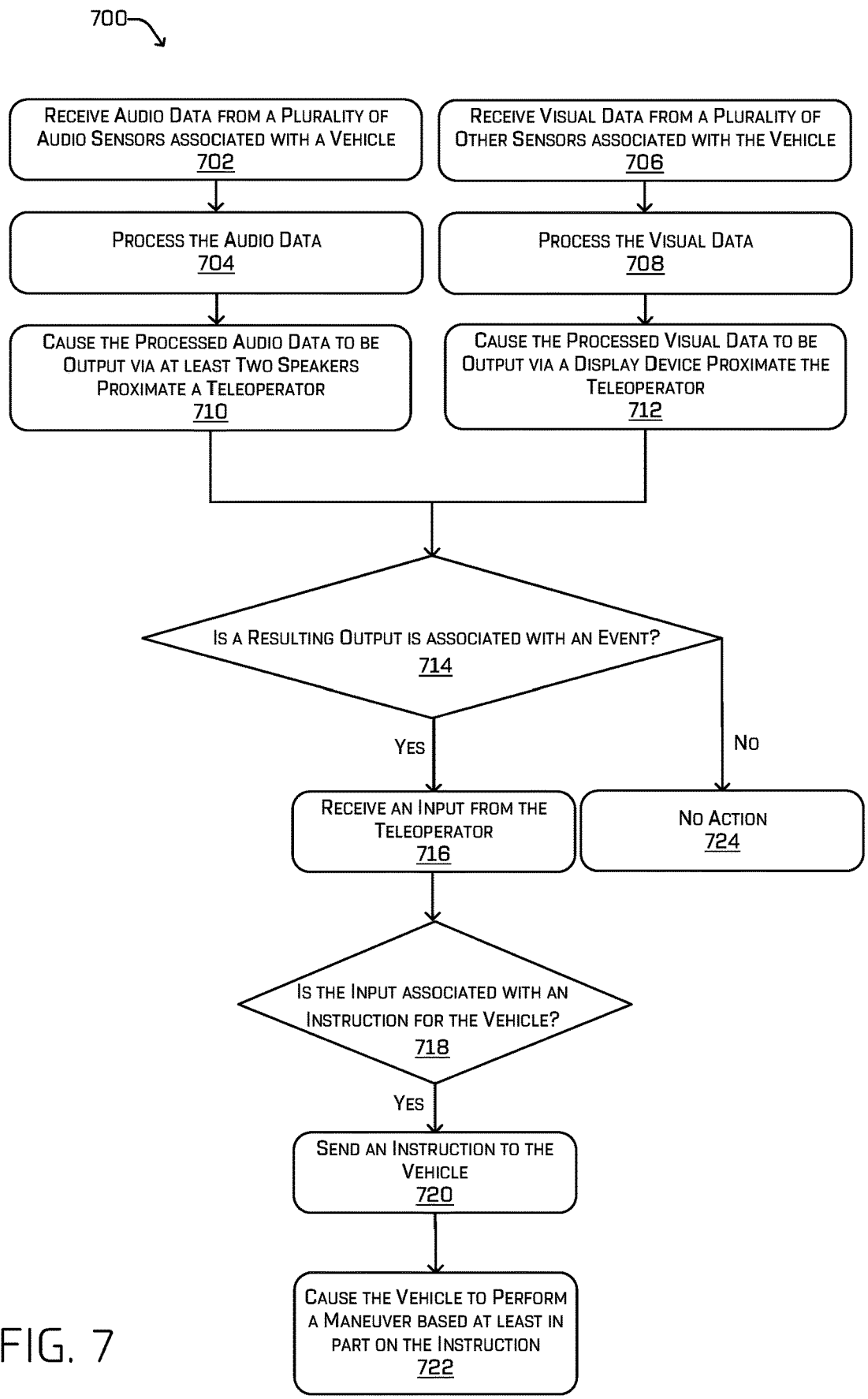
FIG. 7 illustrates an example process for providing an immersive experience (e.g., via sound and virtual reality) for a teleoperator, as described herein.
Figure 8:
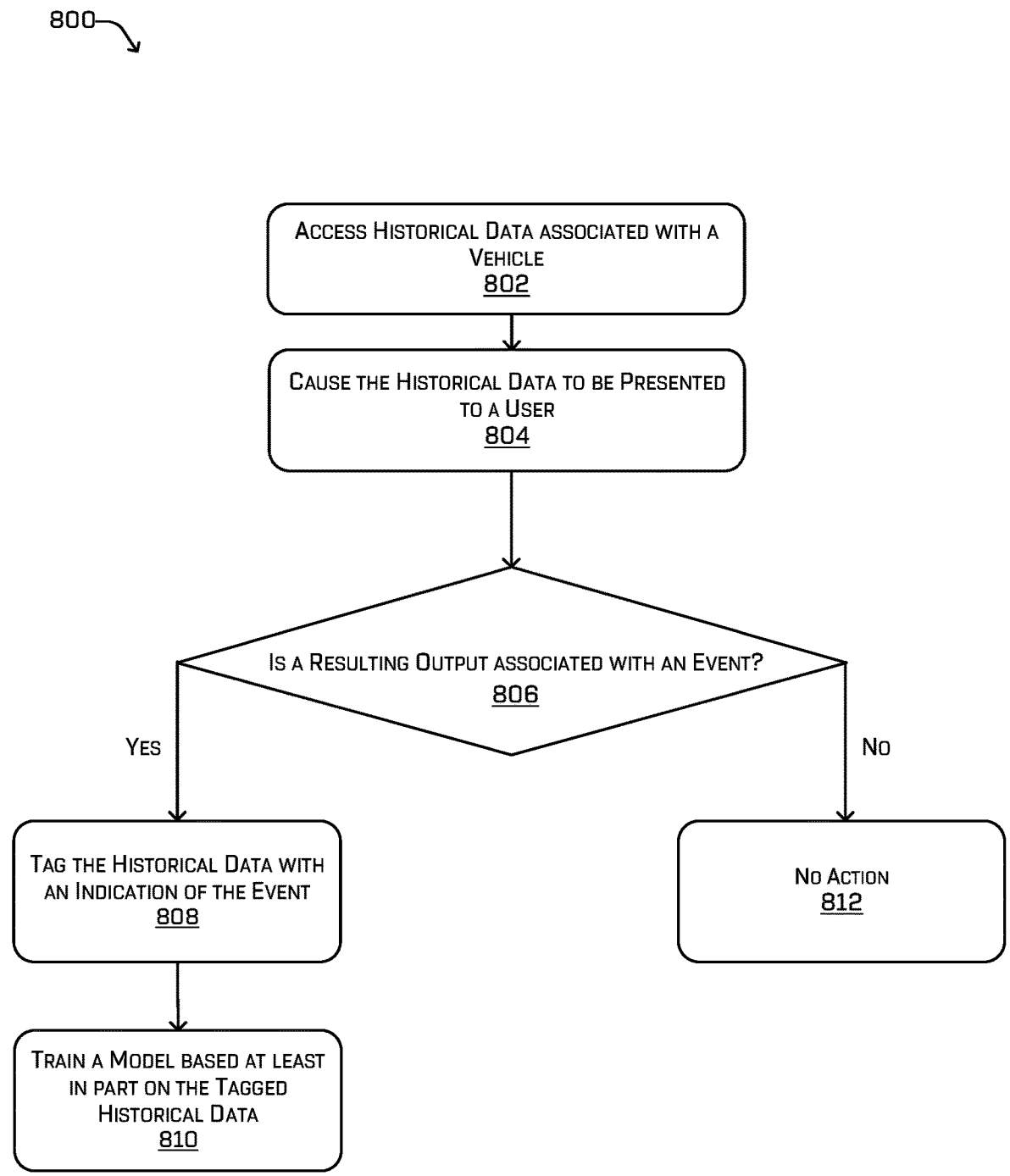
FIG. 8 illustrates an example process for training a model using techniques described herein.

FIGS. 6-8 are flowcharts showing example methods involving techniques as described herein. The methods illustrated in FIGS. 6-8 are described with reference to the system 500 shown in FIG. 5 for convenience and ease of understanding. However, the methods illustrated in FIGS. 6-8 are not limited to being performed using the system 500. Moreover, the system 500 described herein is not limited to performing the methods illustrated in FIGS. 6-8.

The methods 600-800 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 600-800 can be combined in whole or in part with each other or with other methods.

FIG. 6 illustrates an example process 600 for providing immersive sound for a teleoperator, as described herein.

Block 602 illustrates receiving audio data from a plurality of audio sensors associated with a vehicle. As described above, in at least one example, a vehicle 502 can be associated with one or more sensor systems 506 and one or more vehicle computing device(s) 504. In at least one example, the sensor system(s) 506 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. In at least one example, the vehicle 502 can have a plurality of audio sensors (e.g., microphones) that can be located at various positions on the corners, front, back, sides, and/or top of the exterior of the vehicle 502. Audio sensors can additionally be positioned at various locations about the interior of the vehicle 502. As described above with reference to FIGS. 1-4, in at least one example, each audio sensor can be associated with its own captured audio channel. One or more captured audio channels can be referred to herein as "audio data."

Block 604 illustrates processing the audio data. As described above, in at least one example, an audio data processing system 532 can receive audio data and can process the audio data.

In some examples, the audio data processing system 532 can be associated with the vehicle computing device(s) 504. In such examples, the audio sensors of the sensor system(s) 506 can provide the audio data to the vehicle computing device(s) 504. In some examples, the audio sensors of the sensor system(s) 506 can preprocess at least some of the audio data prior to sending the audio data to the vehicle computing device(s) 504. The vehicle computing device(s) 504 can receive the audio data via the audio data processing system 532. In some examples, the audio data 202 can be processed by the audio data processing system 114 and provided to the teleoperator computing device(s) 116 in near real-time. In other examples, the audio data 202 can be processed by the audio data processing system 114 and can be sent to the teleoperator computing device(s) 116 upon detection of an event that invokes teleoperator services. As described above, in at least one example, an event can be detected in the audio data 202 based at least in part on analyzing the audio data 202 using one or more machine learned models that are trained to detect particular events.

In some examples, the audio data processing system 532 can be associated with one or more remotely located computing devices, such as teleoperator computing device(s) 550. In such examples, the audio sensors of the sensor system(s) 506 can send audio data, via network(s) 534, to the teleoperator computing device(s) 550 at a particular frequency, after a lapse of a predetermined period of time, in near real-time, upon an occurrence/detection of an event (e.g., an event), etc. In some examples, the audio sensors of the sensor system(s) 506 can preprocess at least some of the audio data prior to sending the audio data to the teleoperator computing device(s) 550. In some examples, the audio sensors of the sensor system(s) 506 can send the audio data to the vehicle computing device(s) 504 prior to sending the audio data to the teleoperator computing device(s) 550. The teleoperator computing device(s) 550 can receive the audio data via the audio data processing system 532. As described above, in some examples, the audio data 202 can be processed by the audio data processing system 114 in near real-time (e.g., as the audio data 202 is received from the microphones 112). In other examples, the audio data 202 can be processed by the audio data processing system 114 upon detection of an event that invokes teleoperator services. As described above, in at least one example, an event can be detected in the audio data 202 based at least in part on analyzing the audio data 202 using one or more machine learned models that are trained to detect particular events.

In at least one example, the audio data processing system 532 can process the audio data to generate processed audio data. In such an example, the audio data processing system 532 can combine, mix, or otherwise process the audio data received via the audio sensors of the sensor system(s) 506 into fewer channels for output via one or more output components (e.g., speakers). FIGS. 2-4, above, provide additional details associated with such audio data processing.

Block 606 illustrates causing the processed audio data to be output via at least two speakers proximate a teleoperator. As described above, in at least one example, the teleoperator management system 558 associated with the teleoperator computing device(s) 550 can receive the processed audio data and can cause the processed audio data to be output via the input/output component(s) 556. As described above, when the processed audio data is output, the resulting sound can be localized for the teleoperator (e.g., relative to the vehicle 502). That is, the resulting sound can be output as a spatialized, three-dimensional scene such that the teleoperator is immersed with sound. The resulting sound can simulate the real-world environment within which the vehicle 502 is positioned. That is, as a result of causing the processed audio data to be output via respective speakers, the resulting sound can be localized for the teleoperator such that the teleoperator can perceive sound in the environment of the vehicle 502 from the perspective of the vehicle 502 (e.g., the resulting sound can be localized relative to the vehicle 502 for the teleoperator). As such, the teleoperator can perceive sound as if they were located in the vehicle 502, even though the teleoperator is remotely located from the vehicle 502. In some examples, as the teleoperator changes his or her position, orientation, etc., the resulting sound can be recast such to track the position, orientation, etc. of the teleoperator (e.g., in near real-time). For instance, if the teleoperator changes which direction he or she is facing, the resulting sound can be recast such to track the teleoperator (e.g., in near real-time).

In at least one example, the teleoperator can identify and/or determine information associated with events occurring in and/or around the vehicle 502, as if the teleoperator where present in the vehicle 502. In at least one example, the teleoperator can determine whether an event occurs, and information associated with the event (e.g., contextual information). As such, the teleoperator can use the resulting output to detect events in the environment of the vehicle 502 and/or to determine whether and/or how to control the vehicle 502 responsive to the detection of events.

In some examples, the teleoperator management system 558 can implement one or more filters to enable the teleoperator to hear particular sounds and/or to mitigate noise in the processed audio data. For instance, the teleoperator management system 558 can apply a filter to emphasize sirens associated with emergency vehicles while mitigating ambient noise associated with birds or the like.

Block 608 illustrates determining whether a resulting sound is associated with an event. In at least one example, the teleoperator can listen to the output to determine whether the resulting sound is associated with an event. In at least one example, the teleoperator can identify when an emergency vehicle is present in an environment of the vehicle 502, whether a pedestrian or other object yells at (or otherwise interacts with) the vehicle 502, whether the vehicle 502 is driving in a construction zone or other area where a construction worker, police officer, or other individual is directing traffic, whether another vehicle honks at the vehicle 502, whether passengers are entering or exiting the vehicle, or the like. In at least one example, the resulting sound can additionally convey information associated with the event (e.g., contextual information). For instance, if the event is associated with the presence of the emergency vehicle, the teleoperator can determine whether an emergency vehicle is present in the environment, how many emergency vehicles are present in the environment, a type of each emergency vehicle present in the environment, where each emergency vehicle is relative to the vehicle 502 in the environment (e.g., a direction of arrival associated with the event), a direction of travel of each emergency vehicle relative to the vehicle 502, a velocity at which each emergency vehicle is moving relative to the vehicle 502, etc. In another example, if the event is another vehicle in an environment of the vehicle 102 honking at the vehicle 102, the teleoperator can determine which vehicle is honking and/or contextual information associated with the event. As an additional or alternative example, if the event is associated with a pedestrian yelling at the vehicle 502, the teleoperator can determine what it is the pedestrian is yelling, the direction from which the pedestrian is yelling, and/or other contextual information associated with the event. As such, the teleoperator can use the resulting output to detect events and/or determine information associated with such events (e.g., contextual information) to determine whether and/or how to control the vehicle 502 responsive to the detection of events.

In some examples, as described above, the teleoperator can monitor events by listening to sound resulting from processed audio data in near-real time. In such examples, the teleoperator can detect events as described above. In additional or alternative examples, the teleoperator may not monitor events all the time. In such examples, a machine learned model can be trained to determine the occurrence of an event and can send a notification to the teleoperator responsive to determining the occurrence of the event. That is, upon detection (e.g., via a machine learned model) of the occurrence of an event in the sound resulting from the processed audio data, the teleoperator management system 558 can alert the teleoperator of such event and the teleoperator can determine teleoperation services responsive to receiving such an alert/notification. That is, in at least some examples, techniques described herein can be at least partially automated, or in some examples fully automated, via the use of machine learned models.

Block 610 illustrates receiving an input from the teleoperator. In at least one example, the teleoperator can determine an event from the resulting sound and can provide an input via the teleoperator management system 558. In some examples, the input can be associated with an instruction to ignore the event. In other examples, the input can be associated with an instruction for causing the vehicle 502 to perform a maneuver.

Block 612 illustrates determining whether the input is associated with an instruction for the vehicle. Based at least in part on determining that the input is associated with an instruction for the vehicle, the teleoperator computing device(s) 550 can send an instruction to the vehicle 502, as illustrated in block 614.

As described above, the teleoperator can operate teleoperator computing device(s) 550. In at least one example, the teleoperator can control vehicles, such as the vehicle 502, remotely by sending instruction(s) to the vehicles via the teleoperator computing device(s) 550. In at least one example, responsive to detecting an event, the teleoperator can determine that teleoperator services to remotely control the vehicle 502 are warranted. As such, the teleoperator can interact with the teleoperator computing device(s) 550 (e.g., via the teleoperator management system 558) to cause the vehicle 502 to perform a maneuver (e.g., via remote operation), as illustrated in block 616. For instance, the teleoperator can send instruction(s) to the vehicle 502 via the teleoperator computing device(s) 550 that cause the vehicle 502 to slow down, drive to the side of the road, and/or stop. In additional or alternative examples, the teleoperator can send instruction(s) to the vehicle 502 to cause the vehicle 502 to perform another maneuver. In at least one example, the teleoperator can determine the maneuver, and associated instructions, based at least in part on information associated with the event, maps, and other sensor data that is available to the teleoperator. In some examples, instruction(s) sent from the teleoperator computing device(s) 550 can override any decisions made locally by the vehicle 502 (e.g., if the vehicle 502 is operating autonomously). That is, in some examples, the instruction(s) may instruct the vehicle computing device(s) 504 to disregard and/or alter a policy or decision made by the vehicle computing device(s) 504.

Block 618 illustrates refraining from taking any action. If no event is detected, the teleoperator can refrain from taking any action.

FIG. 7 illustrates an example process 700 for providing an immersive experience (e.g., via virtual reality) for a teleoperator, as described herein.

Block 702 illustrates receiving audio data from a plurality of audio sensors associated with a vehicle, which is described above with reference to block 602.

Block 704 illustrates processing the audio data, which is described above with reference to block 604.

Block 706 illustrates receiving visual data from a plurality of other sensors associated with the vehicle. As described above, in addition to audio sensors, the sensor system(s) 506 of the vehicle 502 can additionally include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, environment sensors (e.g., temperature sensors, humidity sensors, light sensors, pressure sensors, etc.), ToF sensors, etc. In at least one example, the camera sensors can generate visual data. Such visual data can be images, videos, or other visual content that represent the environment of the vehicle 502. In some examples, such visual data can include subsets or interpretations of images, videos, or other visual content (e.g., bounding boxes, classifications, etc.). Like with the audio sensors, the camera sensors can include multiple cameras positioned at various locations about the exterior and/or interior of the vehicle 502. Each camera sensor can output its own captured visual data, which can depict the environment of the vehicle 502 from the position of the camera sensor on the vehicle 502.

Block 708 illustrates processing the visual data. In at least one example, the visual data processing system 562 can receive the visual data and perform one or more image processing techniques to generate processed visual data, which can be used for creating a virtual environment based at least in part on the visual data. In some examples, such image processing can include blending individual images, videos, or other visual content to avoid duplication in the virtual environment and/or aligning individual frames of the visual data. In additional or alternative examples, such image processing can perform transformations and/or apply filters in an effort to generate a virtual environment that is consistent and accurate. The visual data processing system 562 can output processed visual data.

Block 710 illustrates causing the processed audio data to be output via at least two speakers proximate a teleoperator, which is described above with reference to block 606.

Block 712 illustrates causing the processed visual data to be output via a display device proximate the teleoperator. In at least one example, the teleoperator management system 558 associated with the teleoperator computing device(s) 550 can receive the processed visual data and can cause the processed visual data to be output via the input/output component(s) 556. For example, the teleoperator management system 558 can cause the processed visual data to be output via a display device, such as a VR display device. As described above, when the processed visual data is output, the resulting image, video, and/or other visual content can be localized for the teleoperator. In at least one example, as a result of causing the processed visual data to be output via the input/output component(s) 556 (e.g., the VR display device), the resulting image, video, and/or visual content can be localized for the teleoperator such that the teleoperator can perceive the environment of the vehicle 502 from the perspective of the vehicle 502. That is, the resulting image can be output as a spatialized, three-dimensional scene such that the teleoperator is immersed in a virtual environment that simulates the real-world environment within which the vehicle 502 is positioned. As such, the teleoperator can perceive the environment as if they were located in the vehicle 502, even though the teleoperator is remotely located from the vehicle 502. As a result, the teleoperator can identify and/or determine information associated with events occurring in and/or around the vehicle 502, as if the teleoperator where present in the vehicle 502.

In at least one example, the teleoperator management system 558 can utilize time stamps to cause the processed audio data to be output substantially synchronously with the processed visual data. As a result, the resulting sound can be substantially synched with the resulting image, video, and/or visual content such that the teleoperator can be fully immersed in a virtual environment that simulates the real-world environment of the vehicle 502. In some examples, the image, video, and/or visual content and/or the resulting sound can be adaptive according to the direction the teleoperator is looking. That is, as the teleoperator changes his or her position, orientation, etc., the resulting image, video, and/or visual content and/or the resulting sound can be recast such to track the position, orientation, etc. of the teleoperator (e.g., in near real-time).

Block 714 illustrates determining whether a resulting output is associated with an event. In at least one example, the teleoperator can listen to and/or view the output to determine whether the resulting output is associated with an event. In at least one example, the teleoperator can identify when an emergency vehicle is present in an environment of the vehicle 502, whether a pedestrian or other object yells at (or otherwise interacts with) the vehicle 502, whether the vehicle 502 is driving in a construction zone or other area where a construction worker, police officer, or other individual is directing traffic, whether another vehicle honks at the vehicle 502, whether passengers are entering or exiting the vehicle, or the like. In at least one example, the resulting sound can additionally convey information associated with the event (e.g., contextual information). For instance, if the event is associated with the presence of the emergency vehicle, the teleoperator can determine whether an emergency vehicle is present in the environment, how many emergency vehicles are present in the environment, a type of each emergency vehicle present in the environment, where each emergency vehicle is relative to the vehicle 502 in the environment (e.g., a direction of arrival associated with the event), a direction of travel of each emergency vehicle relative to the vehicle 502, a velocity at which each emergency vehicle is moving relative to the vehicle 502, etc. In another example, if the event is another vehicle in an environment of the vehicle 102 honking at the vehicle 102, the teleoperator can determine which vehicle is honking and/or contextual information associated with the event. As an additional or alternative example, if the event is associated with a pedestrian yelling at the vehicle, the teleoperator can determine what it is the pedestrian is yelling, the direction from which the pedestrian is yelling, and/or other contextual information associated with the event. In at least one example, the resulting image, video, and/or visual content output via the VR display device can provide additional information regarding the environment within which the vehicle 502 is positioned. As such, the teleoperator can use the resulting output (e.g., sound and image, video, and/or visual content) to detect events and/or determine information associated with such events (e.g., contextual information) to determine whether and/or how to control the vehicle 502 responsive to the detection of events.

In some examples, as described above, the teleoperator can monitor events by listening to output resulting from processed audio data and/or visual data in near-real time. In such examples, the teleoperator can determine events as described above. In additional or alternative examples, the teleoperator may not monitor events all the time. In such examples, a machine learned model can be trained to determine the occurrence of an event and can send a notification to the teleoperator responsive to determining the occurrence of the event. That is, upon detection (e.g., via a machine learned model) of the occurrence of an event in the output resulting from the processed audio data and/or processed visual data, the teleoperator management system 558 can alert the teleoperator of such event and the teleoperator can determine teleoperation services responsive to receiving such an alert/notification. That is, in at least some examples, techniques described herein can be at least partially automated, or in some examples fully automated, via the use of machine learned models.

Block 716 illustrates receiving an input from the teleoperator, which is described above with reference to block 610.

Block 718 illustrates determining whether the input is associated with an instruction for the vehicle, which is described above with reference to block 612. Based at least in part on determining that the input is associated with an instruction for the vehicle 502, the teleoperator computing device(s) 550 can send an instruction to the vehicle 502, as illustrated in block 720.

Block 722 illustrates causing the vehicle to perform a maneuver based at least in part on the instruction, which is described above with reference to block 616.

Block 724 illustrates refraining from taking any action. If no event is detected, the teleoperator can refrain from taking any action.

FIG. 8 illustrates an example process 800 for training a model using techniques described herein.

Block 802 illustrates accessing historical data associated with a vehicle. In at least one example, a training system 542 associated with the computing device(s) 536 can access historical data, such as from the historical data storage 549. As described above, the historical data storage 549 can store data associated with previous operations of a fleet of vehicles. Such historical data can be logs of sensor data received from the sensor system(s) on individual vehicles of the fleet of vehicles, such as the sensor system(s) 506. Such historical data can include visual data, lidar data, radar data, sonar data, and the like. In at least one example, historical data can include audio data and/or processed audio data. In at least one example, of audio data associated with the historical data has not been processed, an audio data processing system can process the audio data thereby generating processed audio data, as described above.

Block 804 illustrates causing the historical data to be presented to a user. In at least one example, the training system 542 can cause a portion of the historical data to be presented via the computing device(s) 536. In some examples, the training system 542 can utilize time stamps to substantially synchronize the output of the processed audio data and other types of the historical data. As such, the user can hear sounds of the environment while observing historical data that corresponds to a same period of time.

Block 806 illustrates determining whether a resulting output is associated with an event. In at least one example, the user can listen to and/or view the resulting output to determine whether the resulting output is associated with an event. In at least one example, the user can identify when an emergency vehicle is present in an environment of the vehicle 502, whether a pedestrian or other object yells at (or otherwise interacts with) the vehicle 502, whether the vehicle 502 is driving in a construction zone or other area where a construction worker, police officer, or other individual is directing traffic, whether another vehicle honks at the vehicle 502, whether passengers are entering or exiting the vehicle, or the like. In at least one example, the resulting sound can additionally convey information associated with the event (e.g., contextual information). For instance, if the event is associated with the presence of the emergency vehicle, the user can determine whether an emergency vehicle is present in the environment, how many emergency vehicles are present in the environment, a type of each emergency vehicle present in the environment, where each emergency vehicle is relative to the vehicle 502 in the environment (e.g., a direction of arrival associated with the event), a direction of travel of each emergency vehicle relative to the vehicle 502, a velocity at which each emergency vehicle is moving relative to the vehicle 502, etc. In another example, if the event is another vehicle in an environment of the vehicle 102 honking at the vehicle 102, the teleoperator can determine which vehicle is honking and/or contextual information associated with the event. As an additional or alternative example, if the event is associated with a pedestrian yelling at the vehicle 502, the user can determine what it is the pedestrian is yelling, the direction from which the pedestrian is yelling, and/or other contextual information associated with the event. In at least one example, the resulting output associated with the historical data can provide additional information, for instance regarding states of other sensor modalities, associated with the environment within which the vehicle 502 is positioned at the same time.

Block 808 illustrates tagging the historical data with an indication of the event. In at least one example, responsive to determining the occurrence of an event, the user can tag, or otherwise associate, the historical data with an indication of the event. For instance, in at least one example, the user can tag historical data with an indication of when an emergency vehicle is present in an environment of the vehicle 502, whether a pedestrian or other object yells at (or otherwise interacts with) the vehicle 502, whether the vehicle 502 is driving in a construction zone or other area where a construction worker, police officer, or other individual is directing traffic, whether another vehicle honks at the vehicle 502, whether passengers are entering or exiting the vehicle 502, or the like. In some examples, the user can associate additional information associated with the tag or other association. That is, the user can associate contextual information, which can be observed from the processed audio data, with the tag or other association.

Block 810 illustrates training a model based at least in part on the tagged historical data. In at least one example, the training system 542 can train machine learned models, as described above. In at least one example, the tagged historical data can be stored in the training data storage 546 and can be used for training machine learned models, such as the machine learned models that can detect an event, as described above.

Block 812 illustrates refraining from taking any action. If no event is detected, the user can refrain from taking any action.

While blocks 802-806 are described above as being performed by the training system 542, in additional or alternative examples, blocks 802-806 can be performed by any other system associated with the system 500.

Example Clauses

A: A method comprising: receiving audio data from a plurality of audio sensors disposed on an autonomous vehicle, wherein each audio sensor of the plurality of audio sensors is associated with a captured audio channel of a plurality of captured audio channels and the plurality of captured audio channels comprises at least two captured audio channels, and wherein the audio data represents sound in an environment of the autonomous vehicle; combining individual captured audio channels of the plurality of captured audio channels into two audio channels for output via a pair of speakers proximate a teleoperator; causing a first audio channel of the two audio channels to be output via a first speaker of the pair of speakers; causing a second audio channel of the two audio channels to be output via a second speaker of the pair of speakers, wherein output of the first audio channel and the second audio channel causes a resulting sound to be localized for the teleoperator; receiving, from a computing device operable by the teleoperator, a command for controlling the autonomous vehicle within the environment; sending, from a computing device operable by the teleoperator, an instruction based at least in part on the command; and causing the autonomous vehicle to maneuver within the environment based at least in part on the instruction.

B: The method as paragraph A recites, wherein the first speaker is associated with a first side of the teleoperator and the second speaker is associated with a second side of the teleoperator, and wherein the resulting sound is rendered as binaural sound output based at least in part on at least one of a position or orientation of the teleoperator relative to a pose of the autonomous vehicle.

C: The method as paragraph A or B recites, wherein the resulting sound is associated with a presence of an emergency vehicle.

D: The method as any of paragraphs A-C recites, wherein the causing the autonomous vehicle to maneuver within the environment based at least in part on the instruction comprises at least one of: causing the autonomous vehicle to slow down; causing the autonomous vehicle to navigate to a side of a road; or causing the autonomous vehicle to stop.

E: The method as any of paragraphs A-D recites, wherein causing the autonomous vehicle to maneuver within the environment comprises causing the autonomous vehicle to refrain from performing an alternative maneuver determined by one or more computing devices onboard the autonomous vehicle.

F: A system comprising: one or more processors; and one or more computer-readable media storing instructions, that when executed by the one or more processors, cause the system to perform operations comprising: receiving audio data from a plurality of audio sensors associated with a vehicle, wherein each audio sensor of the plurality of audio sensors is associated with a captured audio channel of a plurality of captured audio channels; determining, based at least in part on a portion of the plurality of captured audio channels, two or more audio channels for output via two or more speakers proximate a user; causing a first audio channel of the two or more audio channels to be output via a first speaker of the two or more speakers; causing a second audio channel of the two or more audio channels to be output via a second speaker of the two or more speakers, wherein output of the first audio channel and the second audio channel causes a resulting sound corresponding to at least a portion of a sound scene associated with the vehicle; and receiving an input from the user based at least in part causing the first audio channel and the second audio channel to be output via the first speaker and the second speaker.

G: The system as paragraph F recites, the operations further comprising receiving the two or more audio channels from one or more computing devices onboard the vehicle.

H: The system as paragraph F or G recites, wherein the audio data is received in near real-time, the operations further comprising determining the two or more audio channels based at least in part on combining at least the portion of the plurality of captured audio channels.

I: The system as any of paragraphs F-H recites, wherein the audio data is received responsive to an event being detected in the audio data, the operations further comprising determining the two or more audio channels based at least in part on combining at least the portion of the plurality of captured audio channels.

J: The system as any of paragraphs F-I recites, wherein the determining the two or more audio channels is based at least in part on determining a direction in which the user is facing and a direction in which the vehicle is facing.

K: The system as any of paragraphs F-J recites, wherein the input comprises an instruction for causing the vehicle to perform a maneuver, the operations further comprising sending the instruction to the vehicle to cause the vehicle to perform the maneuver.

L: The system as paragraph K recites, wherein the maneuver comprises at least one of: causing the vehicle to slow down; causing the vehicle to navigate to a side of a road; or causing the vehicle to stop.

M: The system as any of paragraphs F-L recites, wherein the resulting sound is associated with a presence of an emergency vehicle in an environment of the vehicle and information comprising at least one of: whether the emergency vehicle is present in the environment of the vehicle; whether other emergency vehicles are present in the environment of the vehicle; a type of the emergency vehicle; a location of the emergency vehicle relative to the vehicle; a direction of travel associated with the emergency vehicle relative to the vehicle; or a relative distance between the emergency vehicle and the vehicle.

N: One or more computer-readable media storing instructions, that when executed by one or more processors, cause the one or more processors to perform operations comprising: receiving audio data from a plurality of audio sensors associated with a vehicle, wherein each audio sensor of the plurality of audio sensors is associated with a captured audio channel of a plurality of captured audio channels; determining, based at least in part on at least a portion of the audio data, two or more audio channels for output via two or more speakers proximate a user; causing a first audio channel of the two or more audio channels to be output via a first speaker of the two or more speakers; causing a second audio channel of the two or more audio channels to be output via a second speaker of the two or more speakers; and receiving, from the user, an input based at least in part on a resulting sound output via the two or more speakers.

O: The one or more computer-readable media as paragraph N recites, wherein determining the two or more audio channels comprises combining at least the portion of the audio data to generate a binaural rendering.

P: The one or more computer-readable media as paragraph N or O recites, wherein determining the two or more audio channels is based at least in part on determining a direction in which the user is facing and a direction in which the vehicle is facing, or a characteristic associated with the user Q: The one or more computer-readable media as any of paragraphs N-P recites, wherein the audio data is received in near real-time or the audio data is received responsive to an event being detected in the audio data.

R: The one or more computer-readable media as any of paragraphs N-Q recites, the operations further comprising: receiving the two or more audio channels from one or more computing devices onboard the vehicle; and causing the two or more audio channels to be output based at least in part on an orientation of the user.

S: The one or more computer-readable media as any of paragraphs N-R recites, the operations further comprising: receiving, from one or more cameras associated with the vehicle, visual data associated with the vehicle; and causing the visual data to be output substantially synchronously with the audio data via a virtual reality display device proximate the user.

T: The one or more computer-readable media as any of paragraphs N-S recites, wherein the vehicle is an autonomous vehicle and the input is an instruction for causing the autonomous vehicle to maneuver within an environment, wherein the input causes the autonomous vehicle to refrain from performing an alternative maneuver determined by one or more computing devices onboard the autonomous vehicle.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving audio data from a plurality of audio sensors disposed on an autonomous vehicle, wherein each audio sensor of the plurality of audio sensors is associated with a captured audio channel of a plurality of captured audio channels and the plurality of captured audio channels comprises at least two captured audio channels, and wherein the audio data represents sound in an environment of the autonomous vehicle;
combining individual captured audio channels of the plurality of captured audio channels into two audio channels for output via a pair of speakers proximate a teleoperator remotely located from the autonomous vehicle;
causing a first audio channel of the two audio channels to be output via a first speaker of the pair of speakers, wherein the first speaker is associated with a first side of the teleoperator;
causing a second audio channel of the two audio channels to be output via a second speaker of the pair of speakers, wherein the second speaker is associated with a second side of the teleoperator, wherein output of the first audio channel and the second audio channel causes a resulting sound to be localized for the teleoperator, wherein the resulting sound is rendered as binaural sound output based at least in part on an orientation of the teleoperator relative to a pose of the autonomous vehicle;
receiving, from a computing device operable by the teleoperator, a command for controlling the autonomous vehicle within the environment;
sending, from the computing device operable by the teleoperator, an instruction based at least in part on the command; and
causing the autonomous vehicle to maneuver within the environment based at least in part on the instruction.

2. The method as claim 1 recites, wherein the causing the autonomous vehicle to maneuver within the environment based at least in part on the instruction comprises at least one of:
causing the autonomous vehicle to slow down;
causing the autonomous vehicle to navigate to a side of a road; or
causing the autonomous vehicle to stop.

3. The method as claim 1 recites, wherein causing the autonomous vehicle to maneuver within the environment comprises causing the autonomous vehicle to refrain from performing an alternative maneuver determined by one or more computing devices onboard the autonomous vehicle.

4. The method as claim 1 recites, wherein the first speaker and second speaker are of one or more head mounted audio devices configured to worn on a head of the teleoperator.

5. A system comprising:
one or more processors; and
one or more computer-readable media storing instructions, that when executed by the one or more processors, cause the system to perform operations comprising:
receiving audio data from a plurality of audio sensors associated with a vehicle, wherein each audio sensor of the plurality of audio sensors is associated with a captured audio channel of a plurality of captured audio channels;
determining, based at least in part on a portion of the plurality of captured audio channels, two or more audio channels for output via two or more speakers proximate a user remotely located from the vehicle;
causing a first audio channel of the two or more audio channels to be output via a first speaker of the two or more speakers, wherein the first speaker is associated with a first side of the user;
causing a second audio channel of the two or more audio channels to be output via a second speaker of the two or more speakers, wherein the second speaker is associated with a second side of the user, wherein output of the first audio channel and the second audio channel causes a resulting sound corresponding to at least a portion of a sound scene associated with the vehicle, wherein the resulting sound is rendered as binaural sound output based at least in part on at least one of a position or orientation of the user relative to a pose of the vehicle; and
receiving an input from the user based at least in part causing the first audio channel and the second audio channel to be output via the first speaker and the second speaker.

6. The system as claim 5 recites, the operations further comprising receiving the two or more audio channels from one or more computing devices onboard the vehicle.

7. The system as claim 5 recites, wherein the audio data is received in near real-time, the operations further comprising determining the two or more audio channels based at least in part on combining at least the portion of the plurality of captured audio channels.

8. The system as claim 5 recites, wherein the audio data is received responsive to an event being detected in the audio data, the operations further comprising determining the two or more audio channels based at least in part on combining at least the portion of the plurality of captured audio channels.

9. The system as claim 5 recites, wherein the determining the two or more audio channels is based at least in part on determining a direction in which the user is facing and a direction in which the vehicle is facing.

10. The system as claim 5 recites, wherein the input comprises an instruction for causing the vehicle to perform a maneuver, the operations further comprising sending the instruction to the vehicle to cause the vehicle to perform the maneuver.

11. The system as claim 10 recites, wherein the maneuver comprises at least one of:
causing the vehicle to slow down;
causing the vehicle to navigate to a side of a road; or
causing the vehicle to stop.

12. The system as claim 5 recites, wherein the resulting sound is associated with a presence of an emergency vehicle in an environment of the vehicle and information comprising at least one of:
whether the emergency vehicle is present in the environment of the vehicle;
whether other emergency vehicles are present in the environment of the vehicle;
a type of the emergency vehicle;
a location of the emergency vehicle relative to the vehicle;
a direction of travel associated with the emergency vehicle relative to the vehicle; or
a relative distance between the emergency vehicle and the vehicle.

13. One or more non-transitory computer-readable media storing instructions, that when executed by one or more processors, cause the one or more processors to perform operations comprising:

receiving audio data from a plurality of audio sensors associated with a vehicle, wherein each audio sensor of the plurality of audio sensors is associated with a captured audio channel of a plurality of captured audio channels;

determining, based at least in part on at least a portion of the audio data, two or more audio channels for output via two or more speakers proximate a user remotely located from the vehicle;

causing a first audio channel of the two or more audio channels to be output via a first speaker of the two or more speakers, wherein the first speaker is associated with a first side of the user;

causing a second audio channel of the two or more audio channels to be output via a second speaker of the two or more speakers, wherein the second speaker is associated with a second side of the user; and receiving, from the user, an input based at least in part on a resulting sound outputted via the two or more speakers, wherein the resulting sound is rendered as a binaural sound output based at least in part on at least one of a position or orientation of the user relative to a pose of the vehicle.

14. The one or more non-transitory computer-readable media as claim 13 recites, wherein determining the two or more audio channels comprises combining at least the portion of the audio data to generate the binaural sound output.

15. The one or more non-transitory computer-readable media as claim 13 recites, wherein determining the two or more audio channels is based at least in part on determining a direction in which the user is facing and a direction in which the vehicle is facing, or a characteristic associated with the user.

16. The one or more non-transitory computer-readable media as claim 13 recites, wherein the audio data is received in near real-time or the audio data is received responsive to an event being detected in the audio data.

17. The one or more non-transitory computer-readable media as claim 13 recites, the operations further comprising:
receiving the two or more audio channels from one or more computing devices onboard the vehicle; and
causing the two or more audio channels to be output based at least in part on an orientation of the user.

18. The one or more non-transitory computer-readable media as claim 13 recites, the operations further comprising:
receiving, from one or more cameras associated with the vehicle, visual data associated with the vehicle; and
causing the visual data to be output substantially synchronously with the audio data via a virtual reality display device proximate the user.

19. The one or more non-transitory computer-readable media as claim 13 recites, wherein the vehicle is an autonomous vehicle and the input is an instruction for causing the autonomous vehicle to maneuver within an environment, wherein the input causes the autonomous vehicle to refrain from performing an alternative maneuver determined by one or more computing devices onboard the autonomous vehicle.

20. The one or more non-transitory computer-readable media as claim 13 recites, wherein the resulting sound is associated with a presence of an emergency vehicle in an environment of the vehicle and information comprising at least one of:
whether the emergency vehicle is present in the environment of the vehicle;
whether other emergency vehicles are present in the environment of the vehicle;
a type of the emergency vehicle;
a location of the emergency vehicle relative to the vehicle;
a direction of travel associated with the emergency vehicle relative to the vehicle; or
a relative distance between the emergency vehicle and the vehicle.

* * * * *